United States Patent [19]

Sekiguchi et al.

[11] Patent Number: 5,683,624
[45] Date of Patent: *Nov. 4, 1997

[54] LIQUID CRYSTAL COMPOSITION

[75] Inventors: Yasuko Sekiguchi; Etsuo Nakagawa; Toyoshiro Isoyama; Tetsuya Matsushita, all of Chibaken, Japan

[73] Assignee: Chisso Corporation, Osaka, Japan

[ * ] Notice: The term of this patent shall not extend beyond the expiration date of Pat. No. 5,560,865.

[21] Appl. No.: 573,141

[22] Filed: Dec. 15, 1995

[30] Foreign Application Priority Data

Dec. 28, 1994 [JP] Japan .................... 6-338713

[51] Int. Cl.$^6$ .............. C09K 19/34; C09K 19/30; C09K 19/12

[52] U.S. Cl. .............. 252/299.61; 252/299.63; 252/299.66

[58] Field of Search .............. 252/299.61, 299.63, 252/299.66

[56] References Cited

U.S. PATENT DOCUMENTS

| | | | |
|---|---|---|---|
| 5,516,454 | 5/1996 | Scheuble et al. | 252/299.01 |
| 5,534,187 | 7/1996 | Miyazawa et al. | 252/299.01 |
| 5,534,189 | 7/1996 | Nakagawa et al. | 252/299.63 |
| 5,543,077 | 8/1996 | Rieger et al. | 252/299.63 |
| 5,560,865 | 10/1996 | Nakagawa et al. | 252/299.01 |
| 5,565,140 | 10/1996 | Hittich et al. | 252/299.63 |

*Primary Examiner*—C. H. Kelly
*Attorney, Agent, or Firm*—Wenderoth, Lind & Ponack

[57] ABSTRACT

A LC material for TN and STN modes having a comparatively high Δn and a low viscosity is provided by a LC composition comprising a first component (formula I-c), a second component (formula II-c) and a third component (formula III or IV):

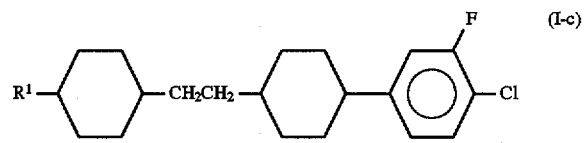

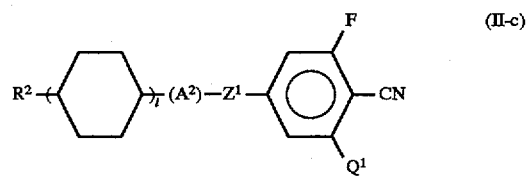

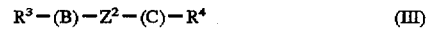

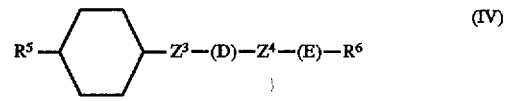

wherein $R^1$ is $C_{1-10}$ alkyl; $R^2$, $R^3$, $R^4$ and $R^5$ are $C_{1-10}$ alkyl or $C_{2-10}$ alkenyl in which alkyl and alkenyl groups one or two non-adjacent methylenes may be replaced by —O—; $R^6$ is $C_{1-10}$ alkyl, alkoxy or alkoxymethyl; $Z^1$ and $Z^3$ are —$CH_2CH_2$—, —COO— or a single bond; $Z^2$ is —C≡C—, —COO—, —$CH_2CH_2$— or a single bond; $Z^4$ is —C≡C—, —COO— or a single bond; $Q^1$ is H or F; $A^2$, B, C and E are trans-1,4-cyclohexylene or 1,4-phenylene; D is trans-1,4-cyclohexylene or 1,4-phenylene in which H(s) at 2- or 3-position may be replaced by F(s); and l is 0 or 1.

23 Claims, No Drawings

LIQUID CRYSTAL COMPOSITION

BACKGROUND OF THE INVENTION

1. Field of the Invention

The present invention relates to a nematic liquid crystal composition and to a liquid crystal display device employing the same. More specifically, the present invention relates to a liquid crystal composition for TN and STN display modes and to a display device using this composition.

2. Description of the Related Art

As a theme for recent problems in the development of a liquid crystal display device (LCD), rapid electro-optical response of the device is strongly desired in order that it can afford to display a moving image. Various attempts have been made for rapid response in various liquid crystal display modes.

For example, in the TN display mode wherein liquid crystal molecules are aligned to be twisted by 90 degrees between a pair of substrates, it is required as G. Bauer reported in Cryst. Liq., 63, 45 (1981) that a product value ($\Delta n \cdot d$) of an optical anisotropy ($\Delta n$) of the liquid crystal material placed in the cell and a cell thickness (d)μm should be defined to a certain value, e.g., $\Delta n \cdot d = 0.5$, $\Delta n \cdot d = 1.0$, etc., in order to prevent an occurrence of infringement stripes in the display surface.

It follows from Bauer's report, that employment of a liquid crystal material of high $\Delta n$ value can reduce the d value. When the d value is reduced, then response speed (1/τ) may be extremely improved because the response time (τ) is proportional to a square of cell thickness (d) and also to a viscosity (θ) of the liquid crystal material. Thus, it is favorable for a liquid crystal composition for those LCD devices to have a suitably high $\Delta n$ value and also a low viscosity.

Further, in a supertwisted nematic (STN) display mode wherein liquid crystal molecules are aligned to be twisted by a certain angle between 180–270 degrees on the inner surfaces of the pair of substrates, it is desired as T. J. Scheffer et al. proposed in Appl. Phys. Lett., 45, (10), 1021 (1984) that the liquid crystal material should exhibit sharpness of voltage-transmittance curve, a high nematic-isotropic phase transition temperature (N-I point), low viscosity, etc. Since the STN display mode makes use of an interference color caused by birefringence effect, an optical path length ($\Delta n \cdot d$) of the double reflaxed light is adjusted to a certain value, e.g. $\Delta n \cdot d = 0.85$, etc. Therefore, when a liquid crystal material of a high $\Delta n$ value is employed in the display device, the response time τ of the device can be extremely reduced as mentioned above.

Accordingly, it is also desirable for a liquid crystal material for the STN display mode to have a suitably high $\Delta n$ and a low viscosity.

Japanese patent application laid-open No. 60-51778 discloses in its example 1 a liquid crystal composition containing a compound of General formula (I-b) of the present invention, however, the present problem is not solved by this composition which exhibits a low $\Delta n$ and a comparatively low viscosity. Further, Japanese patent application laid-open No. 5-500680 discloses a liquid crystal composition containing compounds of present formulas (I-a) and (I-b), however, there is no description on the characteristics therein which are the object of the present invention. Although various LC compositions as described above and the like have been made, it is the present status that there is continuously made an attempt for improving a LC composition having characteristics desired in their use applications.

SUMMARY OF THE INVENTION

An object of the present invention is to provide a liquid crystal composition for TN and STN display modes provided with such various characteristics as mentioned above, including a comparatively high $\Delta n$ and a low viscosity to satisfy rapid electro-optical response particularly.

The present invention in the first aspect resides in, (1) A liquid crystal composition comprising:

a first component consisting of at least one member selected from the group of compounds expressed by general formula (I-a), (I-b) or (I-c):

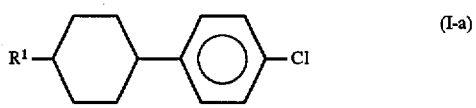

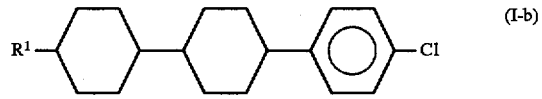

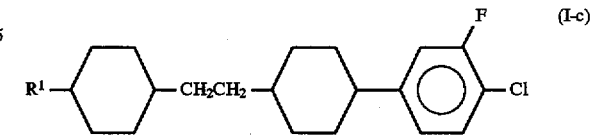

wherein $R^1$ represents an alkyl group of 1 to 10 carbon atoms, a second component consisting of at least one member selected from the group of compounds expressed by general formula (II-a), (II-b) or (II-c):

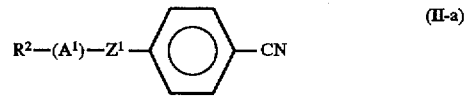

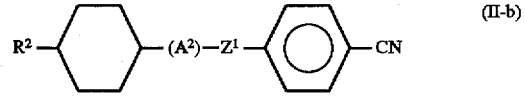

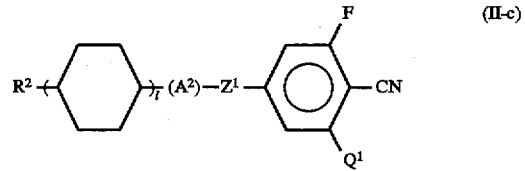

wherein $R^2$ represents an alkyl group of 1 to 10 carbon atoms or an alkenyl group of 2 to 10 carbon atoms in each of which groups one or two non-adjacent methylene groups may be replaced by an oxygen atom; $Z^1$ represents —$CH_2CH_2$—, —COO— or a single bond; $Q^1$ represents H or F; $A^1$ represents trans-1,4-cyclohexylene, 1,4-phenylene or trans-1,3-dioxan-2,5-diyl; $A^2$ represents trans-1,4-cyclohexylene or 1,4-phenylene; and l represents 0 or 1, and a third component consisting of at least one member selected from the group of compounds expressed by general formula (III) or (IV):

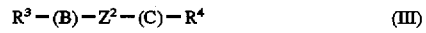  (III)

-continued

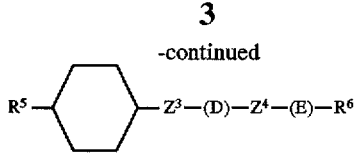
(IV)

wherein, in formula (III), $R^3$ and $R^4$ each independently represent an alkyl group of 1 to 10 carbon atoms or an alkenyl group of 2 to 8 carbon atoms in each of which groups one or two non-adjacent methylene groups may be replaced by an oxygen atom; B and C each independently represent trans-1,4-cyclohexylene or 1,4-phenylene; $Z^2$ represents —C≡C—, —COO—, —CH$_2$CH$_2$— or a single bond; and in formula (IV), $R^5$ represents an alkyl group of 1 to 10 carbon atoms or an alkenyl group of 2 to 10 carbon atoms in each of which groups one or two non-adjacent methylene groups may be replaced by an oxygen atom; $R^6$ represents an alkyl group, an alkoxy group or an alkoxymethyl group each of 1 to 10 carbon atoms; D represents trans-1,4-cyclohexylene or 1,4-phenylene in which a hydrogen atom on either 2- or 3-position may be replaced by F; E represents trans-1,4-cyclohexylene or 1,4-phenylene; $Z^3$ represents —CH$_2$CH$_2$—, —COO— or a single bond; and $Z^4$ represents —C≡C—, —COO— or a single bond.

An embodiment of the present invention resides in, (2) A liquid crystal composition as defined in item (1), wherein mixing proportions of the first, second and third components are 3–40%, 10–70% and 5–60%, respectively, based upon the total weight of the composition.

Another embodiment of the present invention resides in, (3) A liquid crystal composition as defined in item (1) or item (2), further comprising a fourth component consisting of at least one member selected from the group of compounds expressed by general formula (V) or (VI):

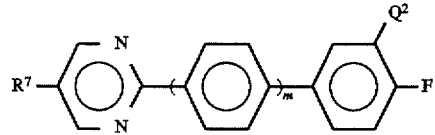
(V)

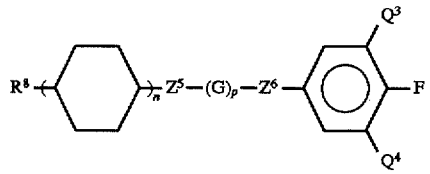
(VI)

wherein, in formula (V), $R^7$ represents an alkyl group of 1 to 10 carbon atoms; $Q^2$ represents H or F; and m represents 0 or 1; and in formula (VI), $R^8$ represents an alkyl group of 1 to 10 carbon atoms; G represents trans-1,4-cyclohexylene or 1,4-phenylene; $Q^3$ and $Q^4$ each independently represent H or F; n represents 1 or 2; p represents 0 or 1; and $Z^5$ and $Z^6$ each independently represent —COO— or a single bond, with a proviso that when p is 0 then $Z^6$ represents a single bond.

Another embodiment of the present invention resides in, (4) A liquid crystal composition as defined in item (3), wherein mixing proportions of the first, second, third and fourth components are 3–40%, 10–70%, 5–60% and up to 50%, respectively, based upon the total weight of the composition.

Still another embodiment of the present invention resides in the following item (5) or item (6).

(5) A liquid crystal composition as defined in item (1) or item (2), further comprising a fourth component consisting of at least one member selected from the group of compounds expressed by general formula (VII) or (VIII):

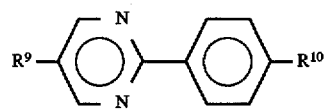
(VII)

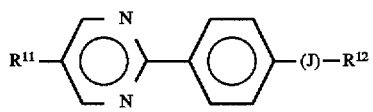
(VIII)

wherein $R^9$, $R^{10}$, $R^{11}$ and $R^{12}$ each independently represent an alkyl group of 1 to 10 carbon atoms or an alkenyl group of 2 to 8 carbon atoms in each of which groups one or two non-adjacent methylene groups may be replaced by an oxygen atom; and J represents trans-1,4-cyclohexylene or 1,4-phenylene.

(6) A liquid crystal composition as defined in item (5), wherein mixing proportions of the first, second, third and fourth components are 3–40%, 10–70%, 5–60% and up to 50%, respectively, based upon the total weight of the composition.

A still further embodiment of the present invention resides in any of the following items (7) to (10).

(7) A liquid crystal composition as defined in item (3) or item (4), further comprising a fifth component consisting of at least one member selected from the group of compounds expressed by general formula (VII) or (VIII):

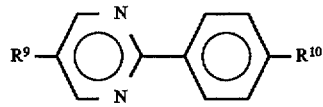
(VII)

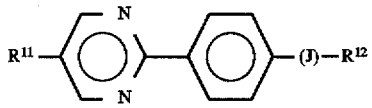
(VIII)

wherein $R^9$, $R^{10}$, $R^{11}$ and $R^{12}$ each independently represent an alkyl group of 1 to 10 carbon atoms or an alkenyl group of 2 to 8 carbon atoms in each of which groups one or two non-adjacent methylene groups may be replaced by an oxygen atom; and J represents trans-1,4-cyclohexylene or 1,4-phenylene.

(8) A liquid crystal composition as defined in item (7), wherein mixing proportions of the first, second, third, fourth and fifth components are 3–40%, 10–70%, 5–60%, up to 40% and up to 40%, respectively, based upon the total weight of the composition, with a proviso that a subtotal mixing proportion of the fourth and fifth components is 50% or less based upon the total weight of the composition.

(9) A liquid crystal composition according to any one of above items (1) to (8), wherein, in the formula (III), $R^3$ and $R^4$ each independently represent an alkyl group or an alkoxy group each of 1 to 10 carbon atoms or an alkoxymethyl group of 2–10 carbon atoms; and $Z^2$ represents —C≡C—, —COO— or a single bond.

(10) A liquid crystal composition according to any one item of above items (1) to (9), wherein, in the formula (IV), $R^5$ represents an alkyl group of 1 to 10 carbon atoms; and $R^6$ represents an alkyl group or an alkoxy group each of 1 to 10 carbon atoms.

The present invention in the second aspect resides in, a liquid crystal display device comprising a liquid crystal composition as defined in any one item of the above items (1) to (10).

DETAILED DESCRIPTION OF THE PREFERRED EMBODIMENTS

Compounds for each component of the present composition will be mentioned below.

Compounds of the first component expressed by formulas (I-a) through (I-c) are compounds having a positive dielectric anisotropy. A compound of formula (I-a) is used with primary aims of reducing a viscosity of a resulting composition and/or of adjusting a Δn thereof. Compounds of formulas (I-b) and (I-c) are used with primary aims of expanding a nematic range of a resulting composition and/or of adjusting a Δn thereof. Those compounds of the first component perform an important function in the present invention to satisfy particularly a rapid electro-optical response in providing a LC composition having a low viscosity and a suitably high Δn value.

As preferable compounds for the second component expressed by formulas (II-a) through (II-c), compounds expressed by each of the following formulas are mentioned.

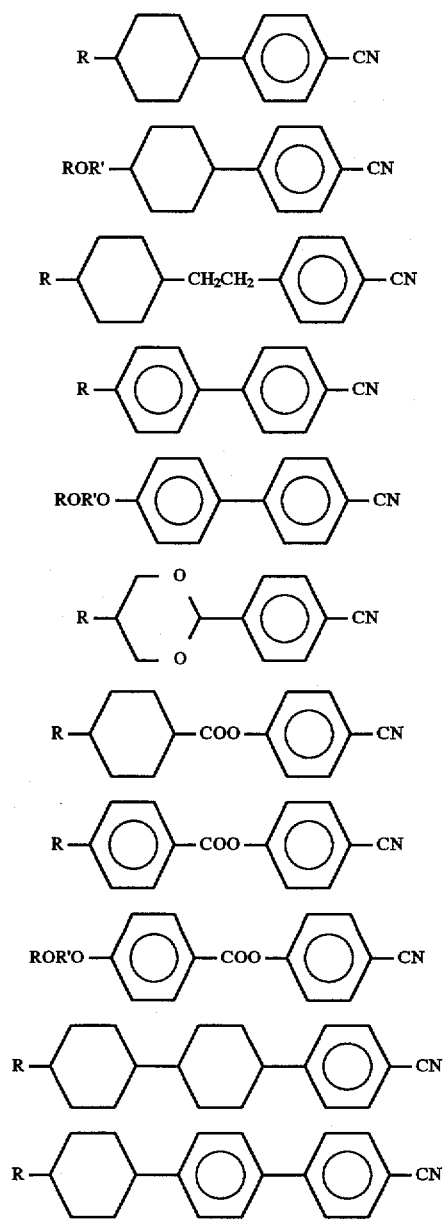
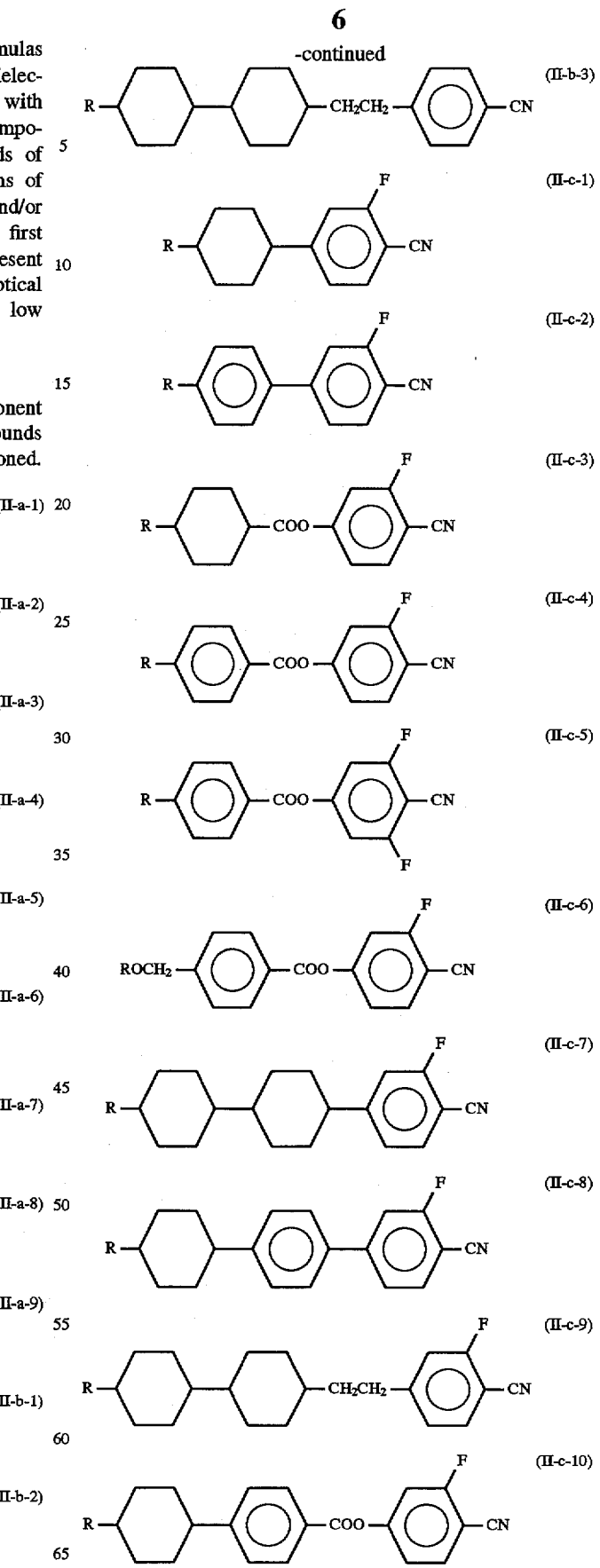

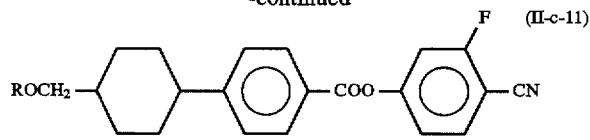

In these formulas R represents an alkyl group or an alkenyl group and R' represents an alkandiyl group or an alkendiyl group, each having a carbon number as defined in the former description.

Among those compounds of the present second component, particularly preferred are those expressed by each of formulas (II-a-1), (II-a-2), (II-a-3), (II-a-4), (II-a-5), (II-a-6), (II-a-7), (II-a-8), (II-a-9), (II-b-1), (II-b-2), (II-c-1), (II-c-4), (II-c-5), (II-c-7), (II-c-10) and (II-c-11).

Compounds of the second components expressed by each of formulas (II-a) through (II-c) have a particularly large positive dielectric anisotropy and are used with a purpose of reducing a threshold voltage of a resulting composition. They are also used with a purpose of improving a steepness characteristic of a transmittance vs. applied voltage curve in a LC display device employing the composition.

As preferable compounds of the third components expressed by formula (III) or formula (IV), those expressed by each of the following formulas are mentioned.

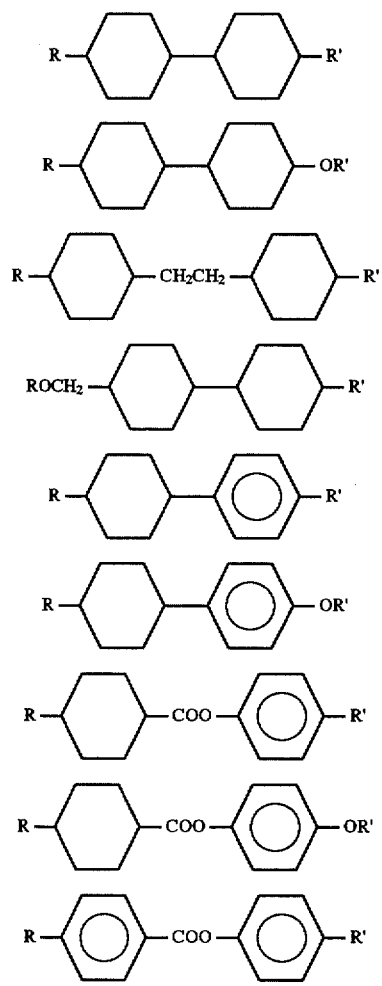

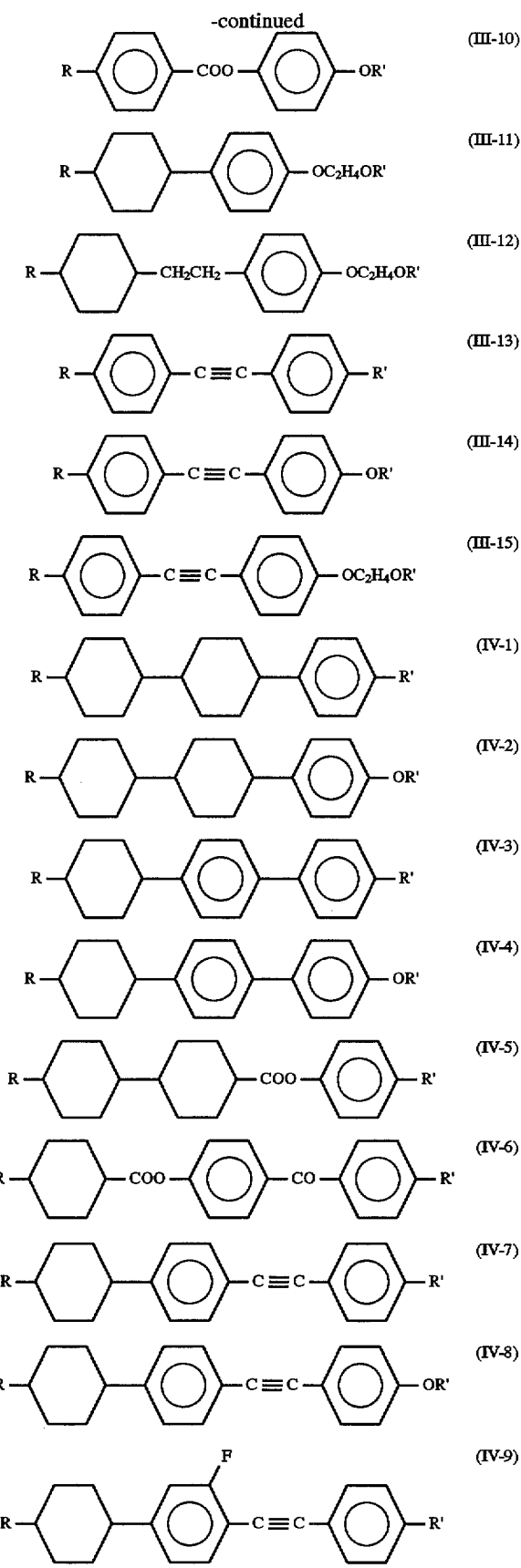

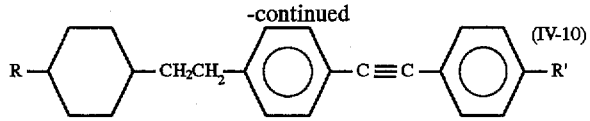
(IV-10)

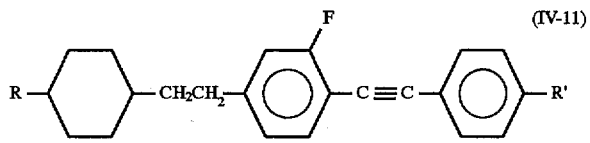
(IV-11)

In each of those formulas, R and R' represent independently an alkyl or alkenyl group each having a carbon number as defined in the former description.

Among the compounds expressed by formula (III), particularly preferred are those expressed by each of formulas (III-1), (III-2), (III-4), (III-6), (III-7), (III-8), (III-13) and (III-14). Among the compounds expressed by formula (IV), particularly preferred are those expressed by each of formulas (IV-1), (IV-2), (IV-5), (IV-9) and (IV-10).

Compounds expressed by formula (III) or formula (IV) have a negative or weak positive dielectric anisotropy. Compounds of formula (III) are used in the present invention with primary aims of reducing a viscosity of a resulting composition and/or of adjusting a Δn value thereof. Compounds of formula (IV) are used with primary aims of enlarging a nematic range of a resulting composition and/or of adjusting a Δn value thereof.

As compounds of the fourth component expressed by formula (V) or formula (VI), those expressed by the following formulas are preferably used.

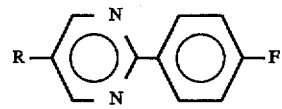
(V-1)

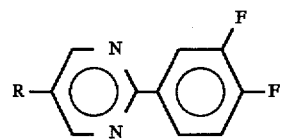
(V-2)

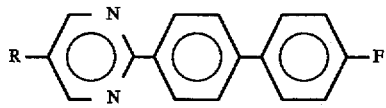
(V-3)

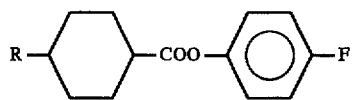
(VI-1)

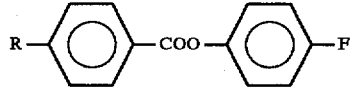
(VI-2)

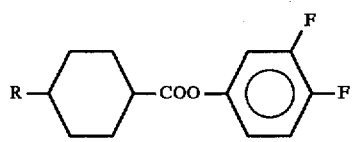
(VI-3)

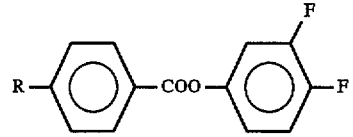
(VI-4)

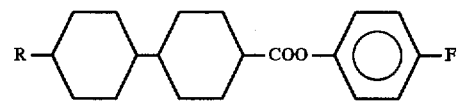
(VI-5)

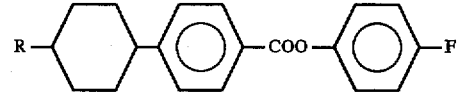
(VI-6)

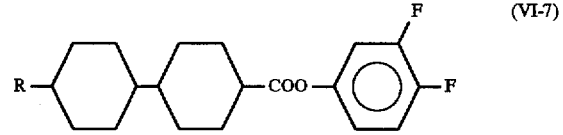
(VI-7)

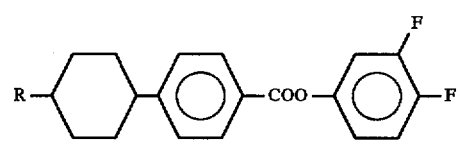
(VI-8)

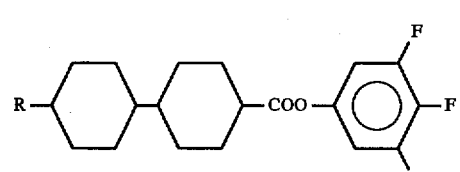
(VI-9)

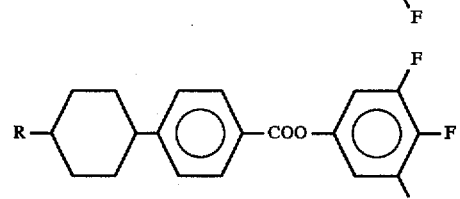
(VI-10)

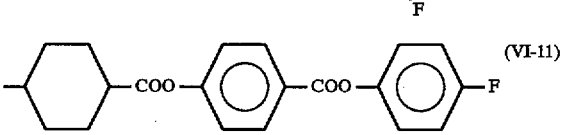
(VI-11)

(VI-12)

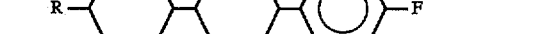
(VI-13)

(VI-14)

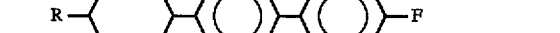
(VI-15)

-continued

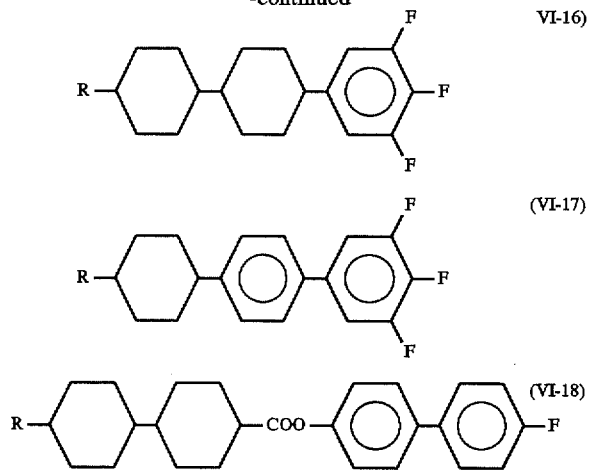

In each of those formulas, R represents an alkyl or alkenyl group having a carbon number as defined in the former description.

Among those compounds of the fourth component expressed by formula (V), those expressed by formula (V-1), formula (V-2) or formula (V-3) are particularly preferred. As compounds of the fourth component expressed by formula (VI), particularly preferred are those expressed by each of formulas (VI-1), (VI-5), (VI-6), (VI-9), (VI-10), (VI-11), (VI-13), (VI-14), (VI-15), (VI-16), (VI-17) and (VI-18).

Compounds of formulas (V) and (VI) have a large positive dielectric anisotropy, and are used with a purpose of reducing a threshold voltage of a resulting composition. They are also used with a purpose of adjusting a Δn value of the composition or of expanding a nematic range thereof.

Preferable compounds for the fifth component expressed by formula (VII) or formula (VIII) are exemplified by the following formulas.

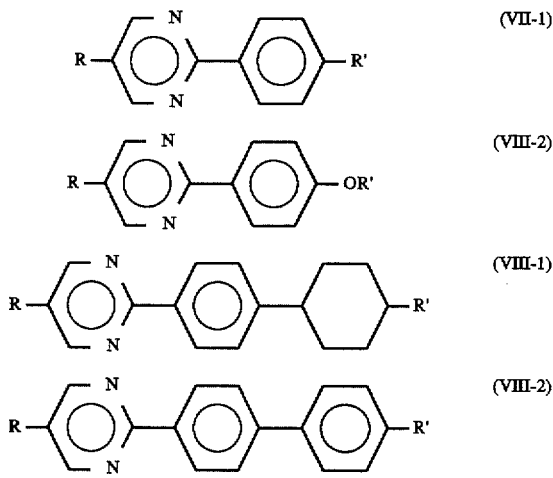

Those compounds of formulas (VII) and (VIII) have a negative or weak positive dielectric anisotropy. Compounds of formula (VII) are used in the present invention with primary aims of adjusting a viscosity and/or a Δn of a resulting composition. Compounds of formula (VIII) are used with aims of expanding a nematic range of a resulting composition and/or of adjusting a Δn value thereof.

A mixing proportion of the first component expressed by formulas (I-a) through (I-c) is preferably 3–40% by weight based upon the total weight of the composition, and is more preferably 5–30% by weight based thereupon. When the mixing proportion of the first component is less than 3% by weight, the primary object of a large Δn value and a low viscosity is often unattainable. When the mixing proportion of the first component exceeds 40% by weight, a threshold voltage of the resulting composition often increases to be undesirable.

A mixing proportion of the second component expressed by formulas (II-a) through (II-c) is preferably 10–70% by weight based upon the total weight of the composition, and is more preferably 12–60% by weight based thereupon. When the mixing proportion of the second component is less than 10% by weight of the resulting composition, the threshold voltage of the composition often increases. When the mixing proportion of the second component exceeds 70% by weight, a large Δn and a low viscosity of the resulting composition is often unattainable.

A mixing proportion of the third component expressed by formula (III) or formula (IV) is preferably 5–60% by weight of the resulting composition, and is more preferably 9–55% by weight based thereupon. When the mixing proportion of the second component is less than 5% by weight, an effect of a low viscosity and/or expansion of a nematic range in the resulting composition is often unattainable. A mixing proportion of more than 60% by weight may very often increase the threshold voltage of the resulting composition.

A mixing proportion of compounds of formulas (V) and (VI) as the fourth component is preferably 50% by weight or less based upon the total weight of the resulting composition. A more preferable mixing proportion of these compounds as the fourth component is 45% by weight or less based thereupon. When the mixing proportion exceeds 50% by weight, a viscosity of the composition often increases.

A mixing proportion of compounds of formulas (VII) and (VIII) as the fourth component is preferably 50% by weight or less based upon the total weight of the resulting composition. A more preferable mixing proportion of these compounds as the fourth component is 40% by weight or less based thereupon. When the the mixing proportion of the fourth component exceeds 50% by weight, a viscosity of the resulting composition often increases to be unfavorable.

When compounds of formulas (V) and/or (VI) are employed as the fourth component and compounds of formulas (VII) and/or (VIII) are employed as the fifth component together in the present invention, a mixing proportion of each of the fourth and fifth components is 40% or less and the total mixing proportion of the fourth and fifth components is 50% or less based upon the total weight of the resulting composition. When the sum of the mixing proportions of the fourth and fifth components exceeds 50% by weight, a viscosity of the resulting composition may often increase. Thus, in case of employing the fourth and fifth components together in the present invention the sum of their mixing proportions is preferably 45% or less based upon the total weight of the resulting composition.

According to purposes of a LC display device employing the LC composition of the present invention, the present composition may contain following other compounds than those of the above-mentioned formulas (I-a) through (VIII), for various purposes such as adjusting a threshold voltage, a nematic range, a Δn, a dielectric anisotropy, or a viscosity, of the resulting composition, in a suitable amount whereby the object of the present invention may be maintained.

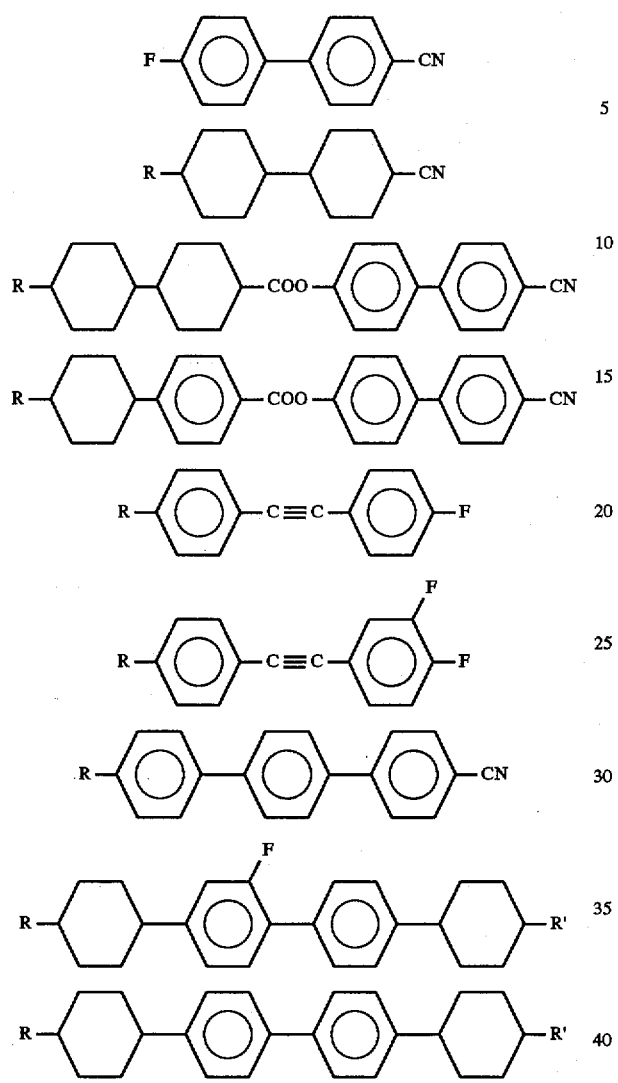

In these formulas, R and R' represent an alkyl group of 1 to 12 carbon atoms.

The LC composition of the present invention may be prepared by a method which is per se conventional. Normally, the present composition is prepared by mixing various component compounds together followed by heating them to produce a uniform mixture.

Further, the present composition may be modified by addition of a suitable compound to be improved to fulfill an intended purpose. Such an additive compound is known by a person skilled in the art to be disclosed precisely in literatures or the like. To the present composition is generally added a chiral dopant which induces a helical structure in the molecules to adjust a twist angle thereof in order to prevent a reverse twist of the LC molecules in display cells.

Furthermore, the composition of the present invention may be used in a guest and host mode display device by addition of dichroic dyestuffs such as merocyanines, styryl derivatives, azo compounds, azomethines, azoxy compounds, quinophthalones, anthraquinones, tetrazine derivatives, etc.

It is also possible to use the liquid crystal composition of the present invention for NCAP prepared by microencapsulating nematic liquid crystals, or for polymer-dispersion type display device (PDLCD) including as a typical example of polymer net-work liquid crystal display device (PNLCD) having three-dimensional, reticulated polymers formed in liquid crystals. Besides, it is possible to use the present liquid crystal composition as a LC material for electrically controlled birefringence (ECB) mode display and a dynamic scattering (DS) mode display.

More preferable embodiments of the present invention are shown in the following items (a) through (e).

(a) A liquid crystal composition comprising the first, second and third components, the first component consisting of at least one compound selected from the group of compounds expressed by the above-mentioned formula (I-a), (I-b) or (I-c), the second component consisting of at least one compound selected from the group of compounds expressed by the above-mentioned formula (II-a-1), (II-a-2), (II-a-3), (II-a-4), (II-a-5), (II-a-6), (II-a-7), (II-a-8), (II-a-9), (II-b-1), (II-b-2), (II-c-1), (II-c-4), (II-c-5), (II-c-6), (II-c-7), (II-c-10) or (II-c-11), the third component consisting of at least one compound selected from the group of compounds expressed by the above-mentioned formula (III-1), (III-2), (III-4), (III-6), (III-7), (III-8), (III-13), (III-14), (IV-1), (IV-2), (IV-5), (IV-9) or (IV-10), mixing proportions of the first, second and third components being 5–30%, 12–60% and 9–55%, respectively, based upon the total weight of the composition.

(b) A liquid crystal composition according to item (a), further comprising the fourth component consisting of at least one compound selected from the group of compounds expressed by the above-mentioned formula (V-1), (V-2), (V-3), (VI-1), (VI-5), (VI-6), (VI-9), (VI-10), (VI-11), (VI-12), (VI-13), (VI-14), (VI-15), (VI-16), (VI-17) or (VI-18), a mixing proportion of the fourth component being at most 45% based upon the total weight of the composition.

(c) A liquid crystal composition according to item (a), further comprising the fourth component consisting of at least one compound selected from the group of compounds expressed by the above-mentioned formula (VII-1), (VII-2), (VIII-1) or (VIII-2), a mixing proportion of the fourth component being at most 40% based upon the total weight of the composition.

(d) A liquid crystal composition according to item (a), further comprising the fourth and fifth components, the fourth component consisting of at least one compound selected from the group of compounds expressed by the above-mentioned formula (V-1), (V-2), (V-3), (VI-1), (VI-5), (VI-6), (VI-9), (VI-10), (VI-11), (VI-12), (VI-13), (VI-14), (VI-15), (VI-16), (VI-17) or (VI-18), the fifth component consisting of at least one compound selected from the group of compounds expressed by the above-mentioned formula (VII-1), (VII-2), (VIII-1) or (VIII-2), mixing proportions of the fourth and fifth components each being at most 40% based upon the total weight of the composition and subtotal of these mixing proportions being at most 45% based upon the total weight of the composition.

(e) A liquid crystal display device comprising a liquid crystal composition as defined by any one of the above items (a) through (d).

EXAMPLES

The present invention will be described by examples and comparative examples below, but the invention is not construed to be limited to the examples. In these examples, the compositions are expressed in percent by weight.

Comparative example

A liquid crystal composition consisting of

C$_3$H$_7$—[Cy]—[Ph]—CN  28%

C$_5$H$_{11}$—[Cy]—[Ph]—CN  42% and

C$_7$H$_{15}$—[Cy]—[Ph]—CN  30% was prepared. A clearing point (T$_{NI}$) of the composition was 52.1° C. A viscosity ($\eta_{20}$), a dielectric anisotropy ($\Delta\epsilon$), and a threshold voltage (V$_{th}$) each at 20° C, of the composition were 22.2 mPa.s, 10.5, and 1.43 V., respectively, and an optical anisotropy ($\Delta$n) at 25° C. of the composition was 0.130.

Example 1

A liquid crystal composition consisting of

C$_3$H$_7$—[Cy]—[Ph]—Cl  12%

C$_5$H$_{11}$—[Cy]—[Ph]—Cl  12%

CH$_2$=CHCH$_2$CH$_2$—[Cy]—[Ph]—CN  10%

CH$_3$CH=CH—CH$_2$CH$_2$—[Cy]—[Ph]—CN  10%

C$_3$H$_7$—[Cy]—[Ph]—CN  10%

CH$_3$CH=CH—CH$_2$CH$_2$—[Ph]—COO—[Ph(F,F)]—CN  3%

C$_3$H$_7$—[Cy]—[Ph]—OC$_2$H$_5$  3%

C$_4$H$_9$—[Ph]—C≡C—[Ph]—OC$_2$H$_5$  6%

C$_3$H$_7$—[Cy]—[Cy]—[Ph]—OCH$_3$  5%

C$_3$H$_7$—[Cy]—[Cy]—[Ph]—CH$_3$  10%

C$_2$H$_5$—[Cy]—CH$_2$CH$_2$—[Ph]—C≡C—[Ph]—C$_2$H$_5$  3%

C$_2$H$_5$—[Cy]—CH$_2$CH$_2$—[Ph]—C≡C—[Ph]—C$_4$H$_9$  3%

C$_3$H$_7$—[Cy]—CH$_2$CH$_2$—[Ph]—C≡C—[Ph]—C$_2$H$_5$  3%

C$_3$H$_7$—[Cy]—CH$_2$CH$_2$—[Ph]—C≡C—[Ph]—C$_3$H$_7$  3%

C$_3$H$_7$—[Cy]—CH$_2$CH$_2$—[Ph]—C≡C—[Ph]—C$_4$H$_9$  3% and

C$_3$H$_7$—[Cy]—[Cy]—[Ph]—F  4% was prepared. A clearing point of the composition was 73.3° C. A viscosity, a dielectric anisotropy, and a threshold voltage each at 20° C, of the composition were 15.7 mPa.s, 7.0, and 1.96 V., respectively, and an optical anisotropy at 25° C. of the composition was 0.139. Comparing these properties with those of the composition in comparative example, $\Delta$n is larger and a viscosity is lower in example 1 than those in comparative example.

Example 2

A liquid crystal composition consisting of

C$_7$H$_{15}$—[Cy]—[Ph]—Cl  10%

C$_4$H$_9$—[Cy]—[Cy]—[Ph]—Cl  10%

C$_3$H$_7$—[Cy]—[Ph]—CN  20%

C$_2$H$_5$—[Ph]—C≡C—[Ph]—OCH$_3$  4%

C$_3$H$_7$—[Ph]—C≡C—[Ph]—OCH$_3$  4%

C$_4$H$_9$—[Ph]—C≡C—[Ph]—OCH$_3$  4%

C$_4$H$_9$—[Ph]—C≡C—[Ph]—OC$_2$H$_5$  4%

C$_5$H$_{11}$—[Ph]—C≡C—[Ph]—OC$_2$H$_5$  4%

C$_3$H$_7$—[Cy]—[Cy]—[Ph]—CH$_3$  6%

C$_3$H$_7$—[Cy]—[Cy]—[Ph]—OCH$_3$  4%

C$_3$H$_7$—[Cy]—[Cy]—[Ph]—C$_3$H$_7$  6%

C$_3$H$_7$—[Cy]—CH$_2$CH$_2$—[Ph]—C≡C—[Ph]—C$_2$H$_5$  3%

C$_3$H$_7$—[Cy]—CH$_2$CH$_2$—[Ph]—C≡C—[Ph]—C$_3$H$_7$  3%

C$_3$H$_7$—[Cy]—[Cy]—[Ph]—F  3%

C$_2$H$_5$—[Cy]—[Cy]—[Ph(F,F)]  5%

-continued

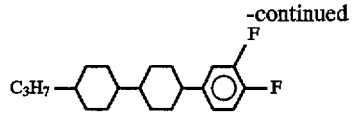 5% and

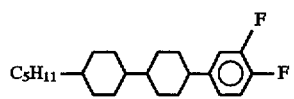 5% was prepared. A clearing point of the composition was 94.0° C. A viscosity, a dielectric anisotropy, and a threshold voltage each at 20° C, of the composition were 19.0 mPa.s, 5.0, and 2.38 V., respectively, and an optical anisotropy at 25° C. of the composition was 0,146. Comparing these properties with those of the composition in comparative example, Δn is larger and a viscosity is lower in example 2 than those in comparative example.

Example 3

A liquid crystal composition consisting of

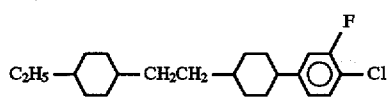 15%

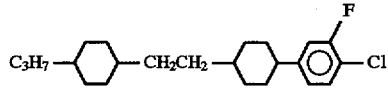 15%

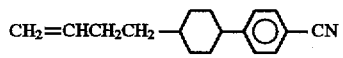 7%

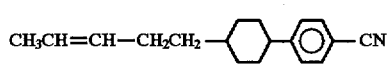 7%

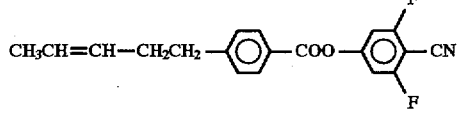 7%

 20%

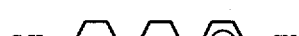 5%

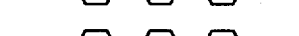 5%

 5%

 5%

 3%

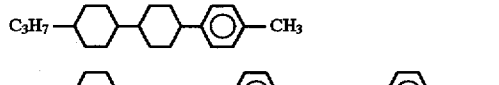 2%

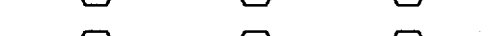 2% and

-continued

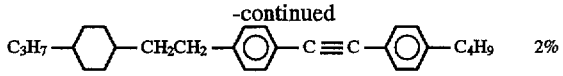 2% was prepared. A clearing point of the composition was 98.8° C. A viscosity, a dielectric anisotropy, and a threshold voltage each at 20° C., of the composition were 15.8 mPa·v.s, 11.9, and 1.77 V., respectively, and an optical anisotropy at 25° C. of the composition was 0.132. Comparing these properties with those of the composition in comparative example, Δn is larger and a viscosity is lower in example 3 than those in comparative example.

Example 4

A liquid crystal composition consisting of

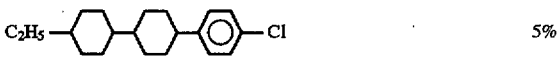 5%

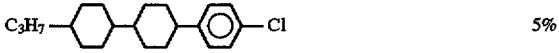 5%

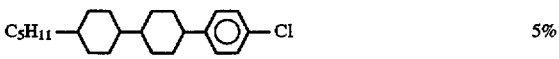 5%

 10%

 10%

 20%

 10%

 5%

 7%

 4%

 7%

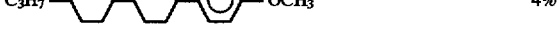 3%

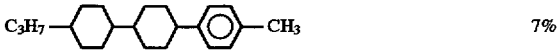 3%

 3% and

 3% was prepared. A clearing point of the composition was 89.8° C. A viscosity, a dielectric anisotropy, and a threshold voltage each at 20° C., of the composition were 21.4 mPa.s, 8.6, and 2.03 V., respectively, and an optical anisotropy at 25° C. of the composition was 0.136.

Example 5

A liquid crystal composition consisting of

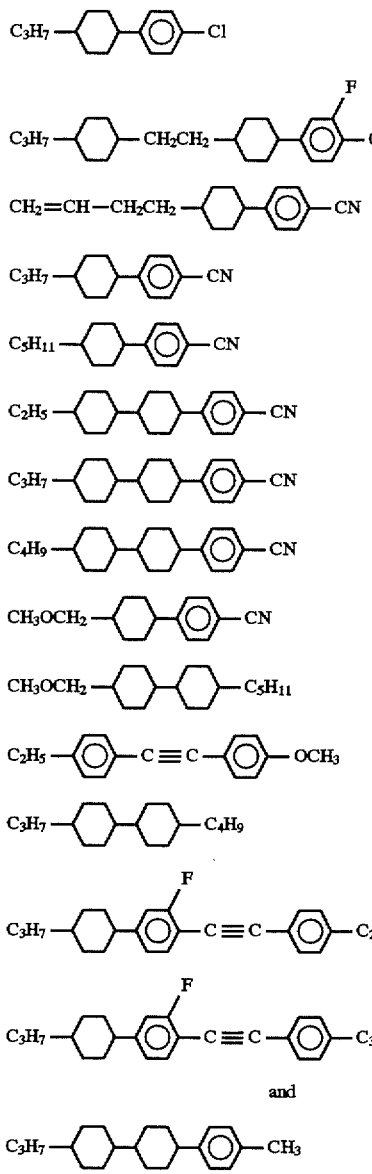

| Component | % |
|---|---|
| C3H7—⬡—◯—Cl | 13% |
| C3H7—⬡—CH2CH2—⬡—◯(F)—Cl | 12% |
| CH2=CH—CH2CH2—⬡—◯—CN | 14% |
| C3H7—⬡—◯—CN | 16% |
| C5H11—⬡—◯—CN | 5% |
| C2H5—⬡—⬡—◯—CN | 3% |
| C3H7—⬡—⬡—◯—CN | 3% |
| C4H9—⬡—⬡—◯—CN | 3% |
| CH3OCH2—⬡—◯—CN | 3% |
| CH3OCH2—⬡—⬡—C5H11 | 4% |
| C2H5—◯—C≡C—◯—OCH3 | 7% |
| C3H7—⬡—⬡—C4H9 | 8% |
| C3H7—⬡—◯(F)—C≡C—◯—C2H5 | 3% |
| C3H7—⬡—◯(F)—C≡C—◯—C3H7 | 3% | and

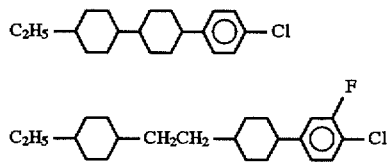

| C3H7—⬡—⬡—◯—CH3 | 3% | was prepared. A clearing point of the composition was 71.9° C. A viscosity, a dielectric anisotropy, and a threshold voltage each at 20° C., of the composition were 14.8 mPa.s, 7.5, and 1.82 V., respectively, and an optical anisotropy at 25° C. of the composition was 0.131.

Example 6

A liquid crystal composition consisting of

| Component | % |
|---|---|
| C2H5—⬡—⬡—◯—Cl | 15% |
| C2H5—⬡—CH2CH2—⬡—◯(F)—Cl | 15% |
| C3H7—⬡—◯—CN | 12% |
| C5H11—⬡—◯—CN | 7% |
| C2H5—⬡—◯—CN | 5% |
| C2H5—⬡—⬡—◯—CN | 3% |
| C3H7—⬡—⬡—◯—CN | 3% |
| C4H9—⬡—⬡—◯—CN | 3% |
| C2H5—◯—C≡C—◯—OCH3 | 2% |
| C2H5—◯—C≡C—◯—CH3 | 5% |
| CH3—◯—C≡C—◯—C6H13 | 10% |
| C4H9—◯—C≡C—◯—C4H9 | 5% |
| C3H7—⬡—⬡—C4H9 | 7% |
| C3H7—⬡—◯(F)—C≡C—◯—C2H5 | 3% | and

| C3H7—⬡—◯(F)—C≡C—◯—C3H7 | 5% | was prepared. A clearing point of the composition was 89.0° C. A viscosity, a dielectric anisotropy, and a threshold voltage each at 20° C., of the composition were 20.8 mPa.s, 6.4, and 2.04 V., respectively, and an optical anisotropy at 25° C. of the composition was 0.154.

Example 7

A liquid crystal composition consisting of

| Component | % |
|---|---|
| C5H11—⬡—◯—Cl | 5% |
| C5H11—⬡—⬡—◯—Cl | 5% |
| C5H11—⬡—CH2CH2—⬡—◯(F)—Cl | 5% |
| C2H5—⬡—◯—CN | 10% |
| C3H7—⬡—◯—CN | 10% |
| C5H11—⬡—◯—CN | 10% |

-continued
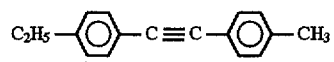 5%
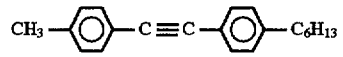 10%
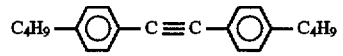 5%
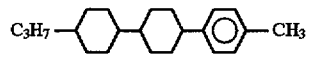 7%
 7%
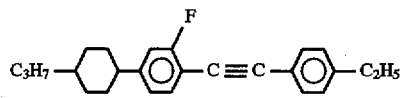 5%
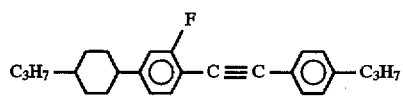 5%
-continued
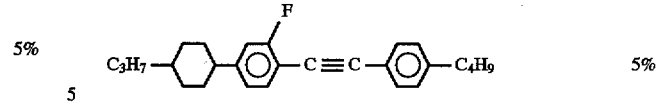 5%
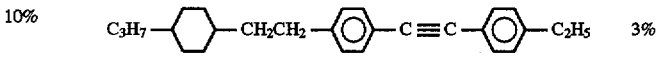 3%
and
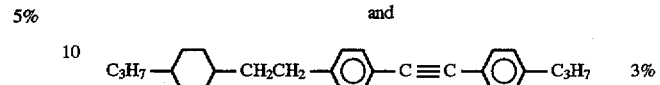 3%
was prepared. A clearing point of the composition was 84.4° C. A viscosity, a dielectric anisotropy, and a threshold voltage each at 20° C., of the composition were 17.5 mPa.s, 5.4, and 2.18 V., respectively, and an optical anisotropy at 25° C. of the composition was 0.162.
Example 8
A liquid crystal composition consisting of
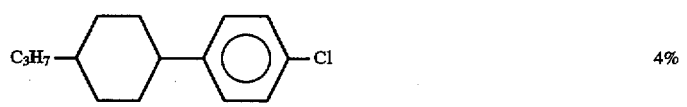 4%
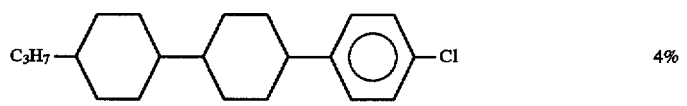 4%
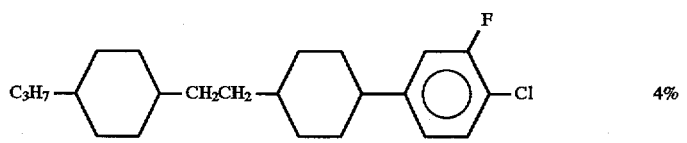 4%
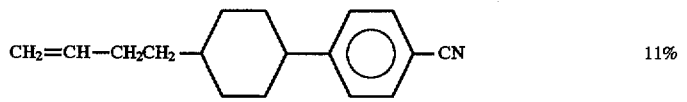 11%
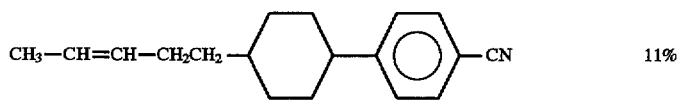 11%
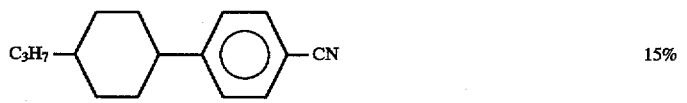 15%
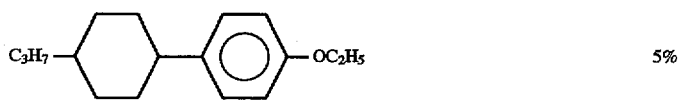 5%
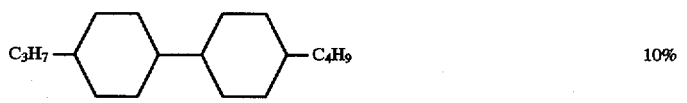 10%
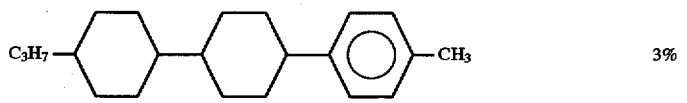 3%

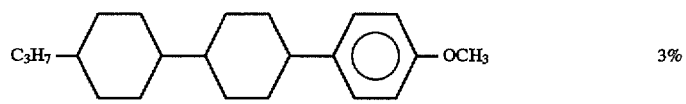
3%
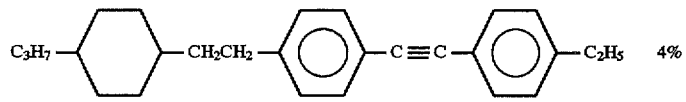
4%
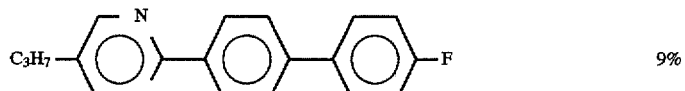
9%
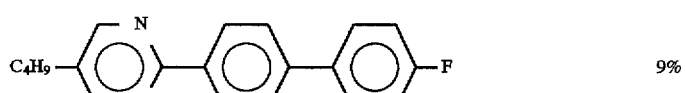
9%
and
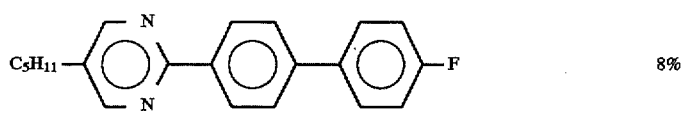
8%
was prepared. A clearing point of the composition was 93.6° C. A viscosity, a dielectric anisotropy, and a threshold voltage each at 20° C., of the composition were 21.2 mPa.s, 9.2, and 1.90 V., respectively, and an optical anisotropy at 25° C. of the composition was 0.156.
Example 9
A liquid crystal composition consisting of
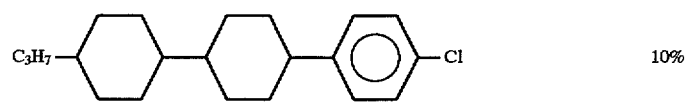
10%
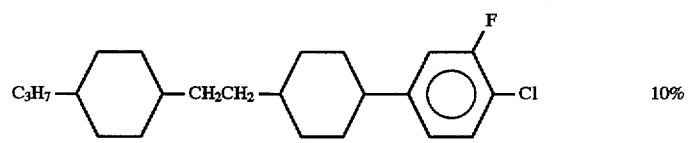
10%
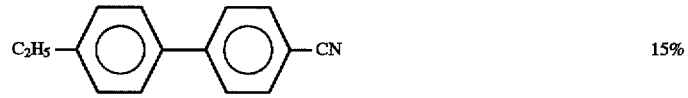
15%
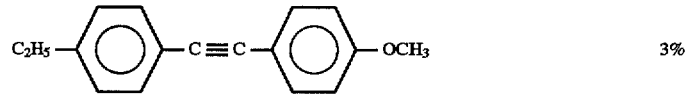
3%
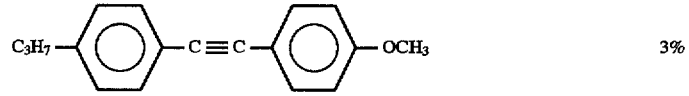
3%
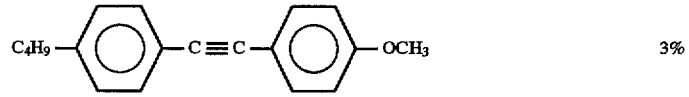
3%
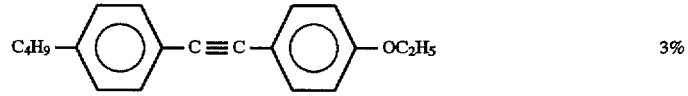
3%

-continued
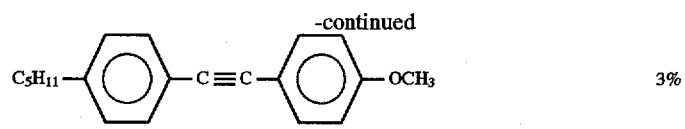  3%
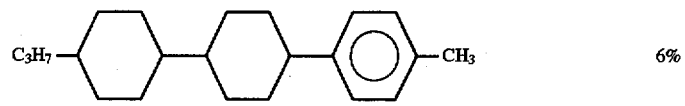  6%
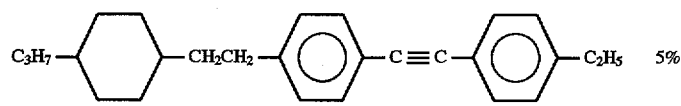  5%
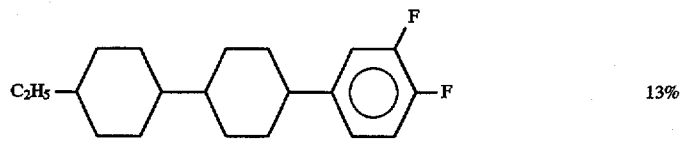  13%
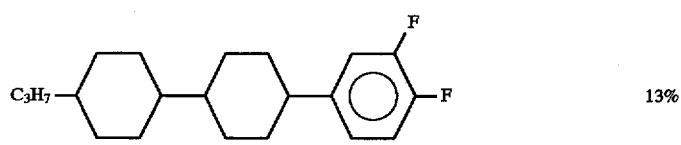  13%
and
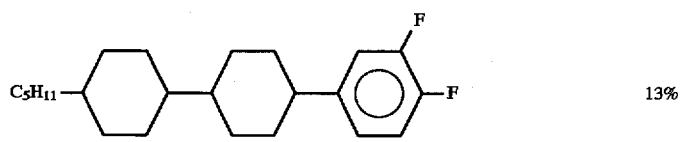  13%
was prepared. A clearing point of the composition was 102.0° C. A viscosity, a dielectric anisotropy, and a threshold voltage each at 20° C., of the composition were 21.4 mPa.s, 6.5, and 2.17 V., respectively, and an optical anisotropy at 25° C. of the composition was 0.151.
Example 10
A liquid crystal composition consisting of
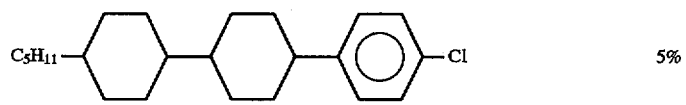  5%
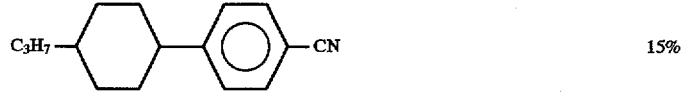  15%
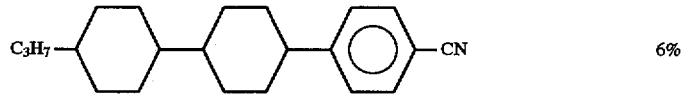  6%
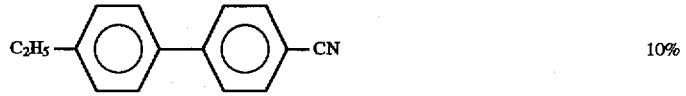  10%
  10%
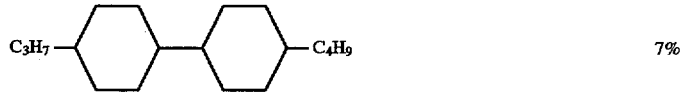  7%

-continued

| Structure | % |
|---|---|
| C₃H₇–(Cy)–(Ph)–OC₂H₅ | 9% |
| C₂H₅–(Ph)–C≡C–(Cy)–OCH₃ | 4% |
| C₃H₇–(Cy)–(Cy)–(Ph)–CH₃ | 4% |
| C₃H₇–(Cy)–CH₂CH₂–(Ph)–C≡C–(Ph)–C₂H₅ | 3% |
| C₃H₇–(Cy)–CH₂CH₂–(Ph)–C≡C–(Ph)–C₃H₇ | 3% |
| C₃H₇–(Pyrimidine)–(Ph)–(Ph)–F | 5% |
| C₄H₉–(Pyrimidine)–(Ph)–(Ph)–F | 5% |
| C₅H₁₁–(Pyrimidine)–(Ph)–(Ph)–F | 5% |
| C₂H₅–(Pyrimidine)–(Ph)–C₂H₅ | 3% |
| C₃H₇–(Pyrimidine)–(Ph)–C₂H₅ | 3% | and

| C₄H₉–(Pyrimidine)–(Ph)–C₂H₅ | 3% | was prepared. A clearing point of the composition was 80.7° C. A viscosity, a dielectric anisotropy, and a threshold voltage each at 20° C., of the composition were 21.9 mPa.s, 9.1, and 1.72 V., respectively, and an optical anisotropy at 25° C. of the composition was 0.167.

Example 11

A liquid crystal composition consisting of

| C₄H₉–(Cy)–CH₂CH₂–(Cy)–(Ph{3-F})–Cl | 10% |
| C₂H₅–(Cy)–(Ph)–CN | 5% |

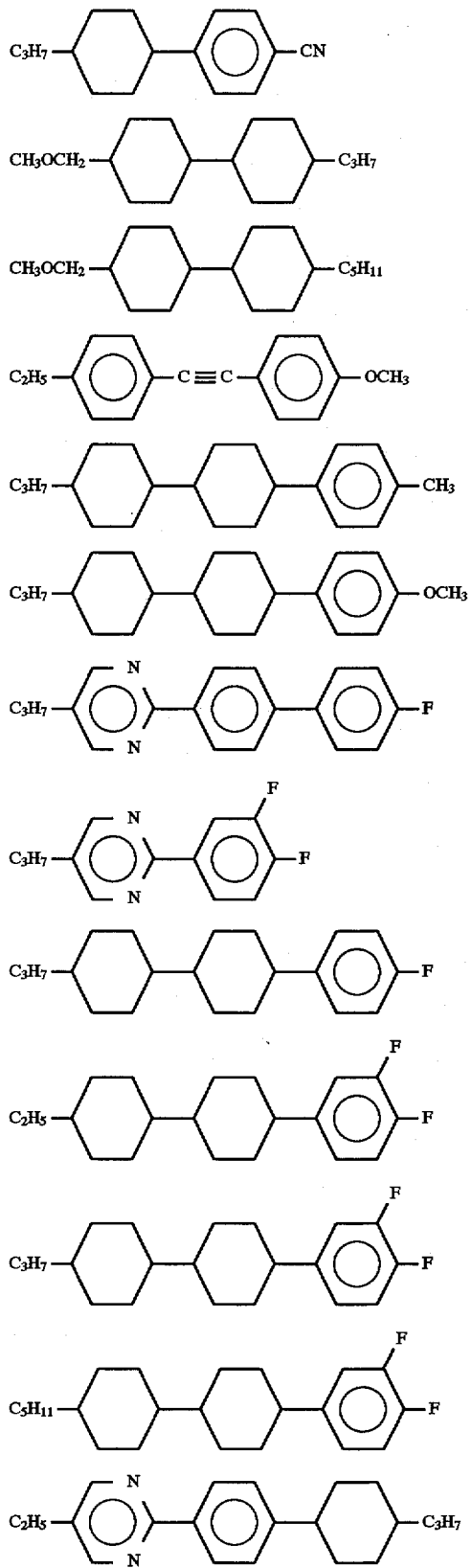
and
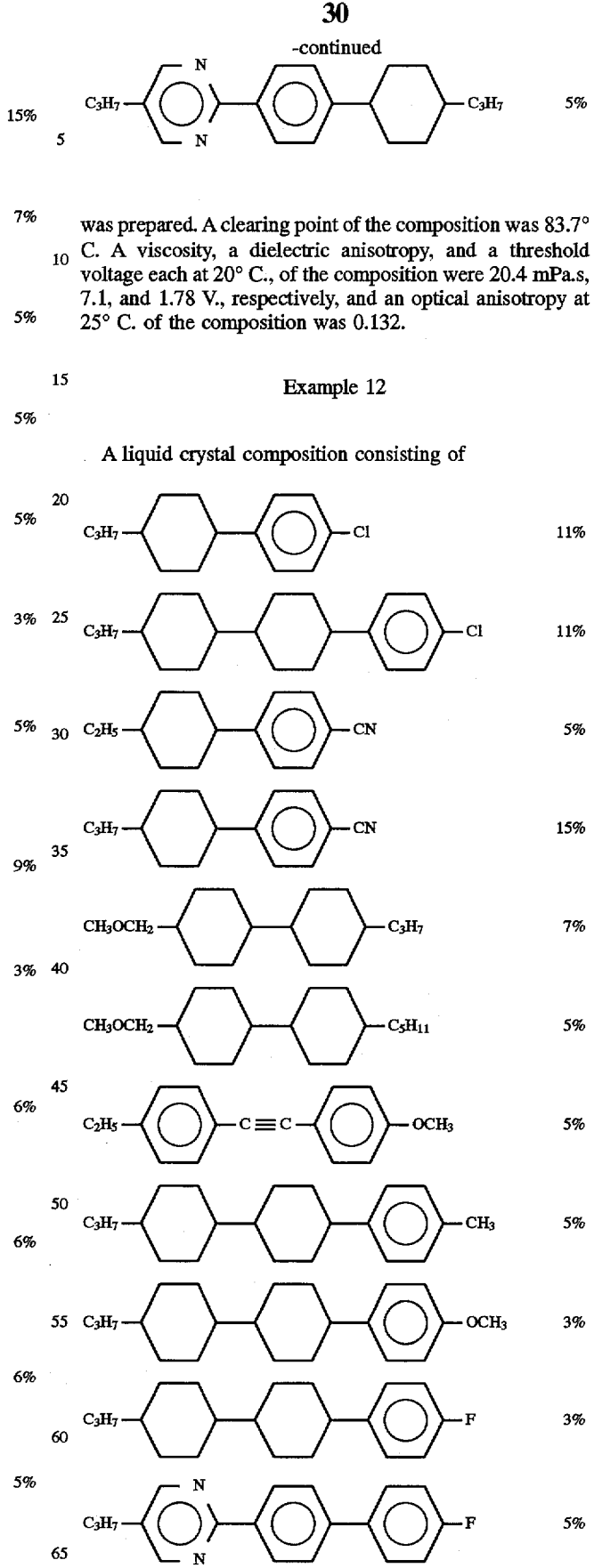
was prepared. A clearing point of the composition was 83.7° C. A viscosity, a dielectric anisotropy, and a threshold voltage each at 20° C., of the composition were 20.4 mPa.s, 7.1, and 1.78 V., respectively, and an optical anisotropy at 25° C. of the composition was 0.132.
Example 12
A liquid crystal composition consisting of -continued

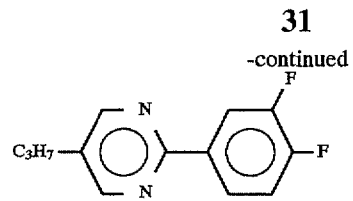 10%

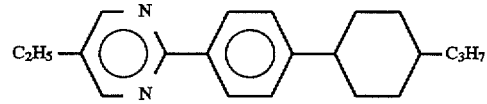 5%

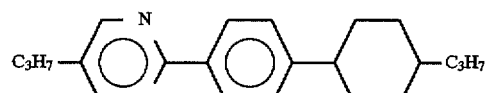 5% and

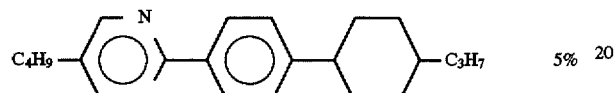 5% was prepared. A clearing point of the composition was 76.8° C. A viscosity, a dielectric anisotropy, and a threshold voltage each at 20° C., of the composition were 17.3 mPa.s, 6.9, and 1.75 V., respectively, and an optical anisotropy at 25° C. of the composition was 0.133.

Example 13

A liquid crystal composition consisting of

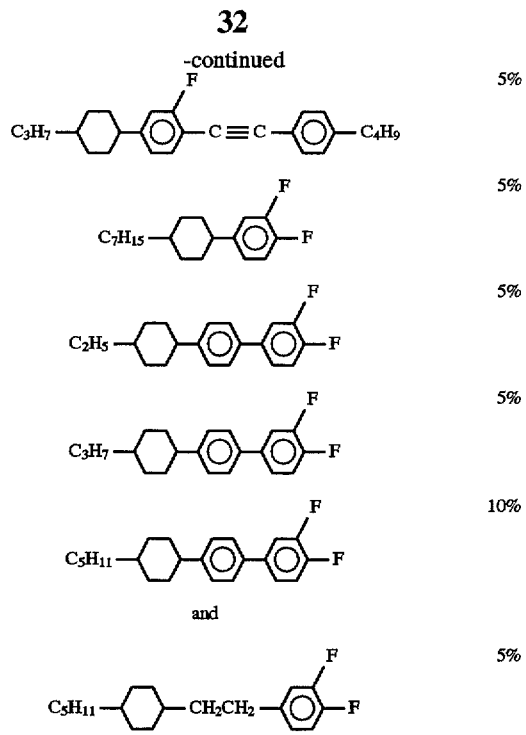

-continued

 5%

 5%

 5%

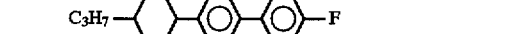 5%

 10% and

 5% was prepared. A clearing point of the composition was 89.4° C. A viscosity, a dielectric anisotropy, and a threshold voltage each at 20° C., of the composition were 20.6 mPa.s, 5.2, and 2.24 V., respectively, and an optical anisotropy at 25° C. of the composition was 0.145.

Example 14

A liquid crystal composition consisting of

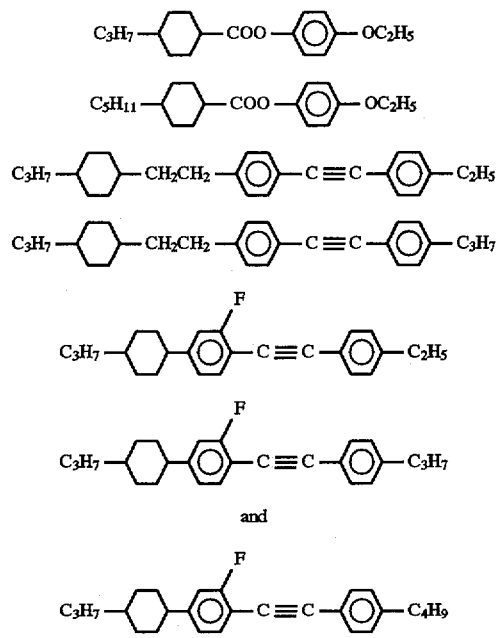
was prepared. A clearing point of the composition was 84.2° C. A viscosity, a dielectric anisotropy, and a threshold voltage each at 20° C., of the composition were 21.8 mPa.s, 7.7, and 1.80 V., respectively, and an optical anisotropy at 25° C. of the composition was 0.137.
Example 15
A liquid crystal composition consisting of
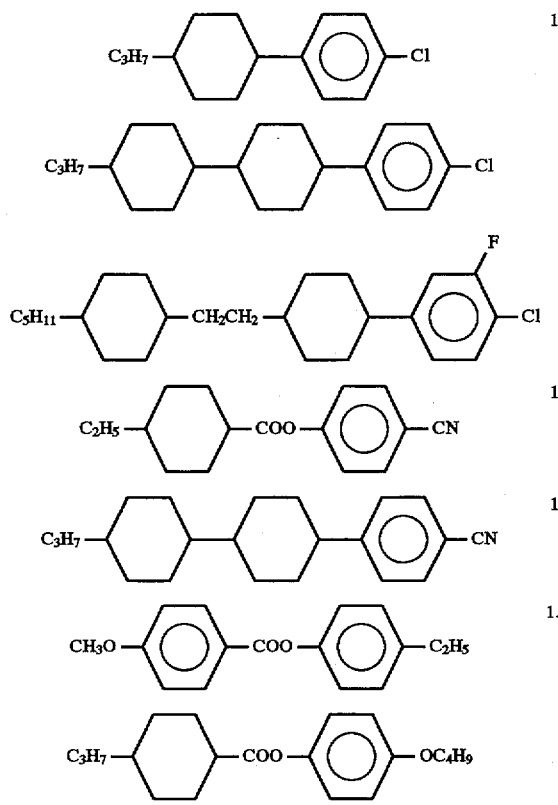
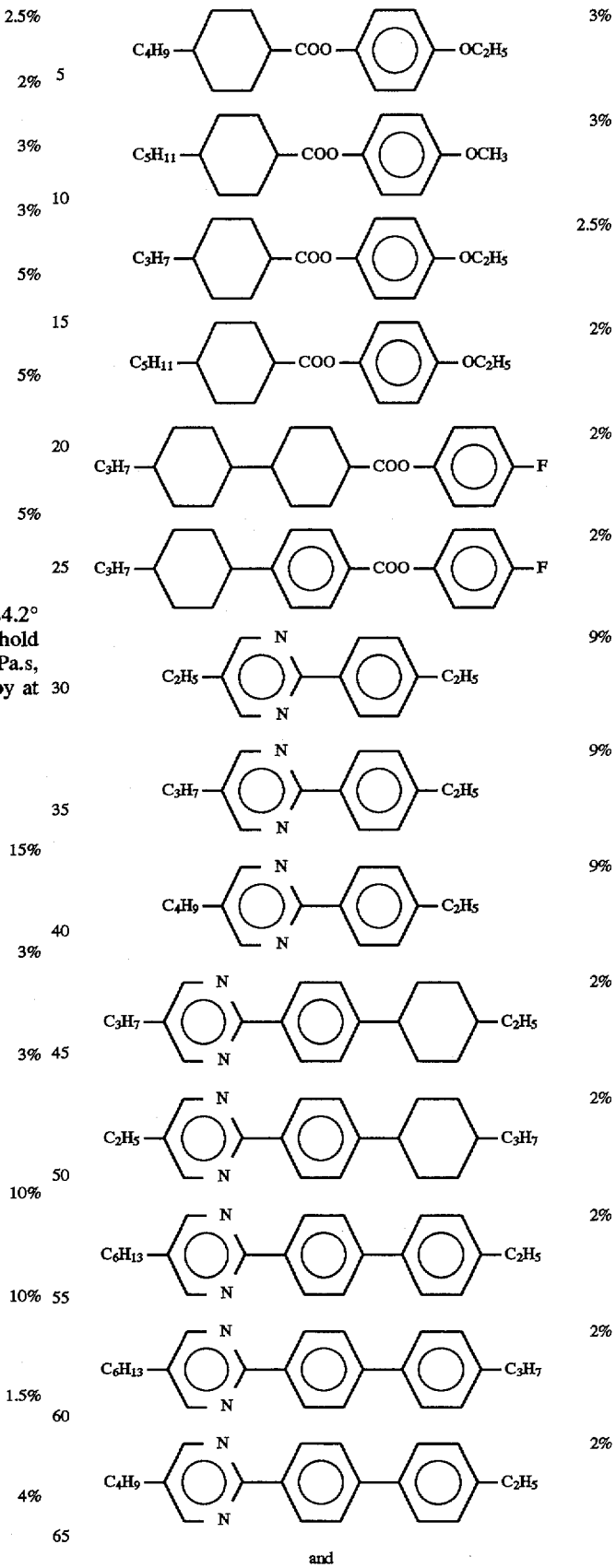

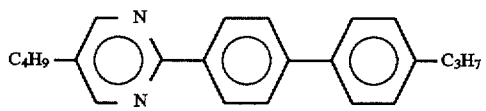

2% was prepared. A clearing point of the composition was 58.4° C. A viscosity, a dielectric anisotropy, and a threshold voltage each at 20° C., of the composition were 21.8 mPa.s, 5.8, and 1.53 V., respectively, and an optical anisotropy at 25° C. of the composition was 0.132.

Example 16

A liquid crystal composition consisting of

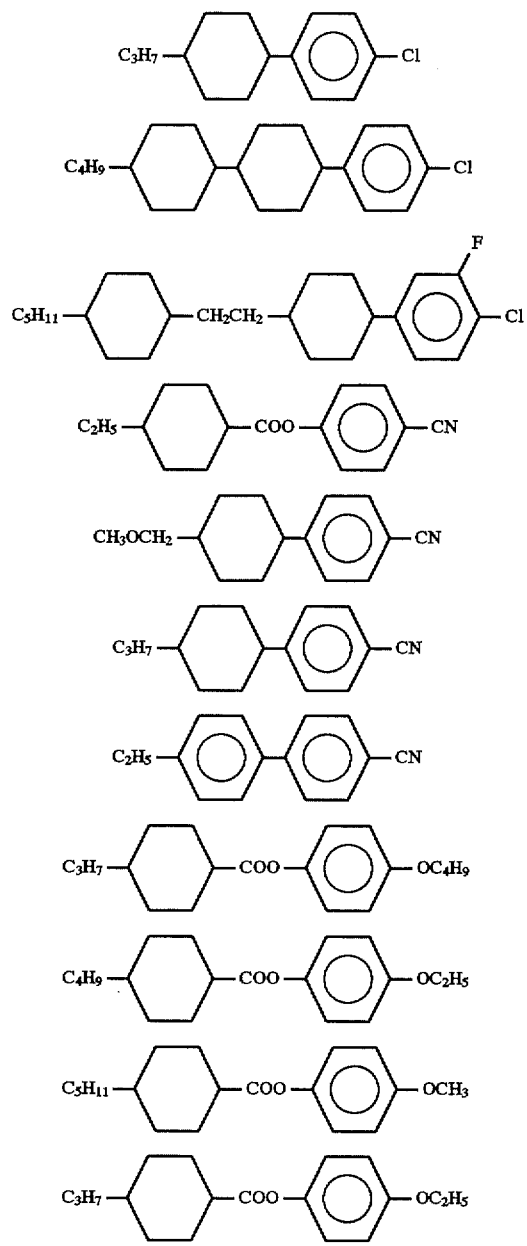

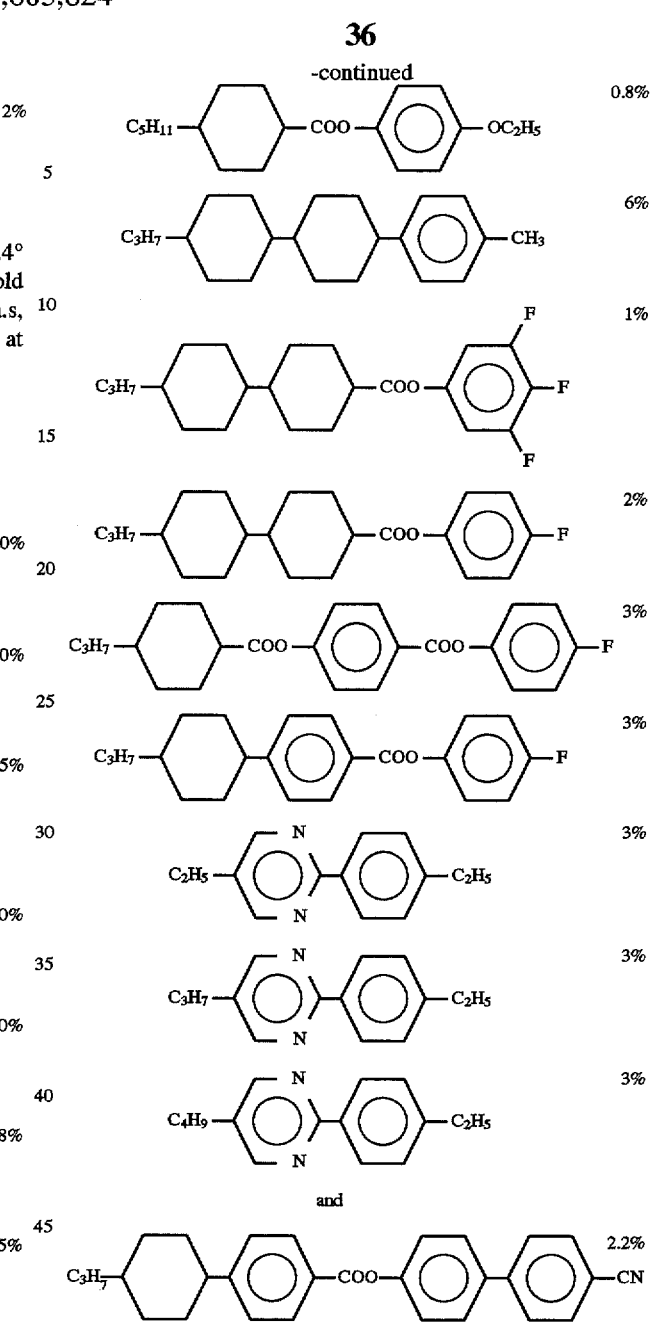

and 2.2% was prepared. A clearing point of the composition was 62.3° C. A viscosity, a dielectric anisotropy, and a threshold voltage each at 20° C., of the composition were 21.0 mPa.s, 11.3, and 1.29 V., respectively, and an optical anisotropy at 25° C. of the composition was 0.131.

Example 17

A liquid crystal composition consisting of

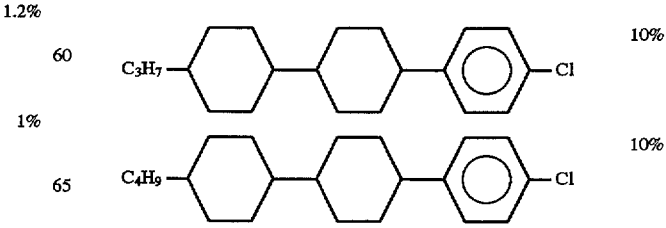

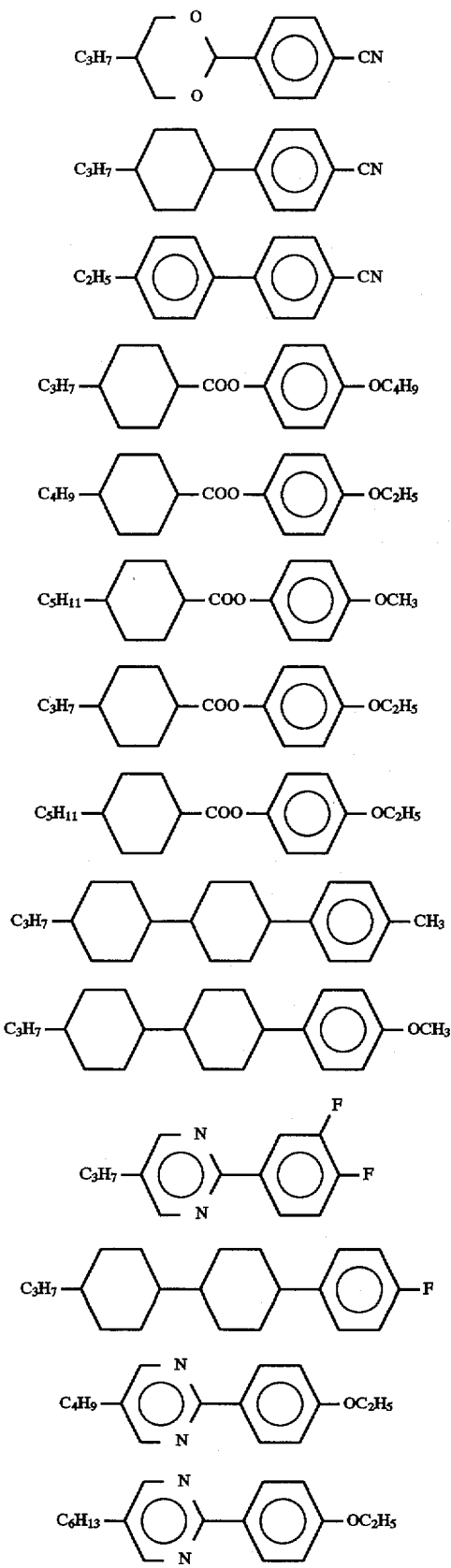
5%
10%
8%
6%
6%
5%
4%
10%
4%
5%
2%
1.1%
2.3%
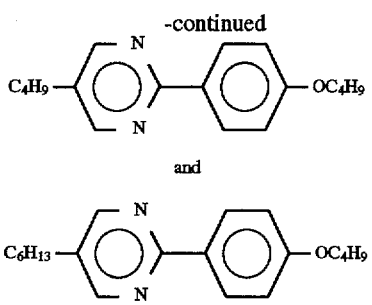
2.1%
and
4.5%
was prepared. A clearing point of the composition was 86.6° C. A viscosity, a dielectric anisotropy, and a threshold voltage each at 20° C., of the composition were 21.6 mPa.s, 5.6, and 1.15 V., respectively, and an optical anisotropy at 25° C. of the composition was 0.133.
Example 18
A liquid crystal composition consisting of
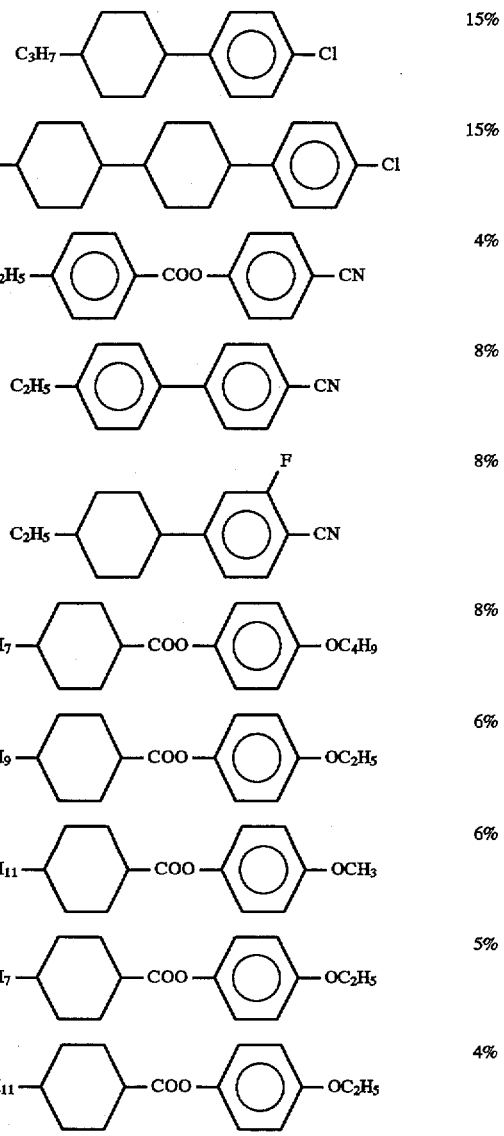
15%
15%
4%
8%
8%
8%
6%
6%
5%
4%

-continued
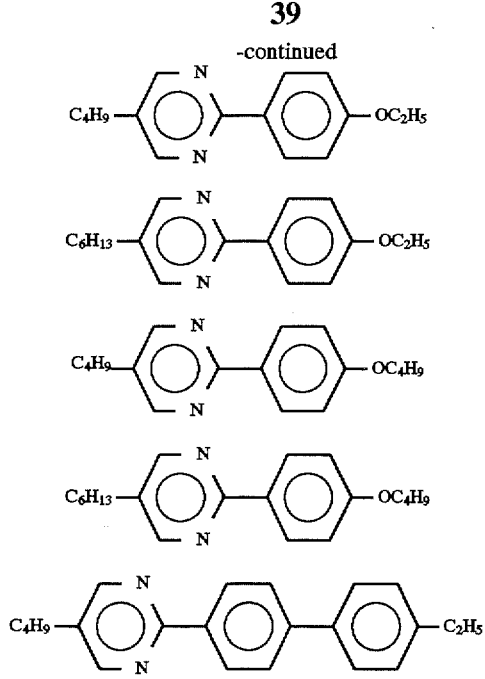
0.88%
1.84%
1.68%
3.6%
4%
-continued
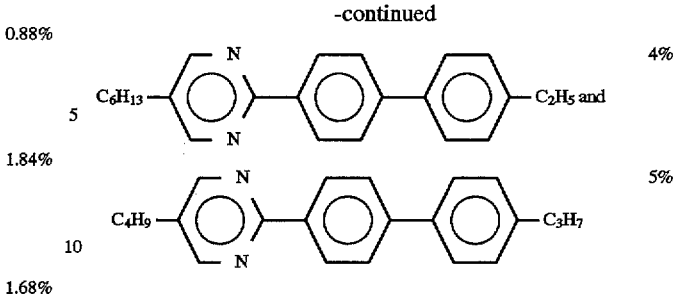
4%
5%
was prepared. A clearing point of the composition was 67.0° C. A viscosity, a dielectric anisotropy, and a threshold voltage each at 20° C., of the composition were 22.0 mPa.s, 6.0, and 1.68 V., respectively, and an optical anisotropy at 25° C. of the composition was 0.132.
Example 19
A liquid crystal composition consisting of
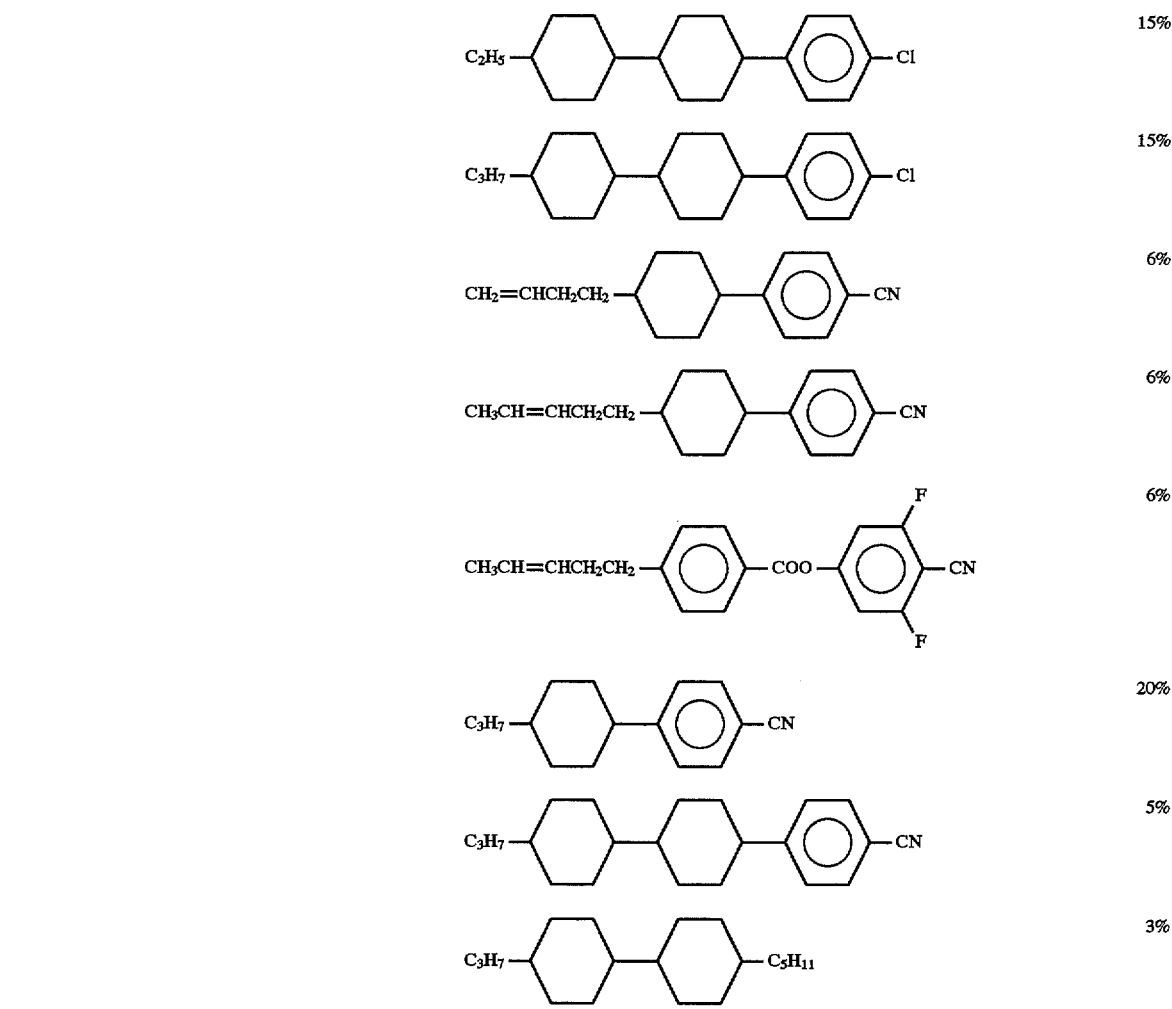
15%
15%
6%
6%
6%
20%
5%
3%

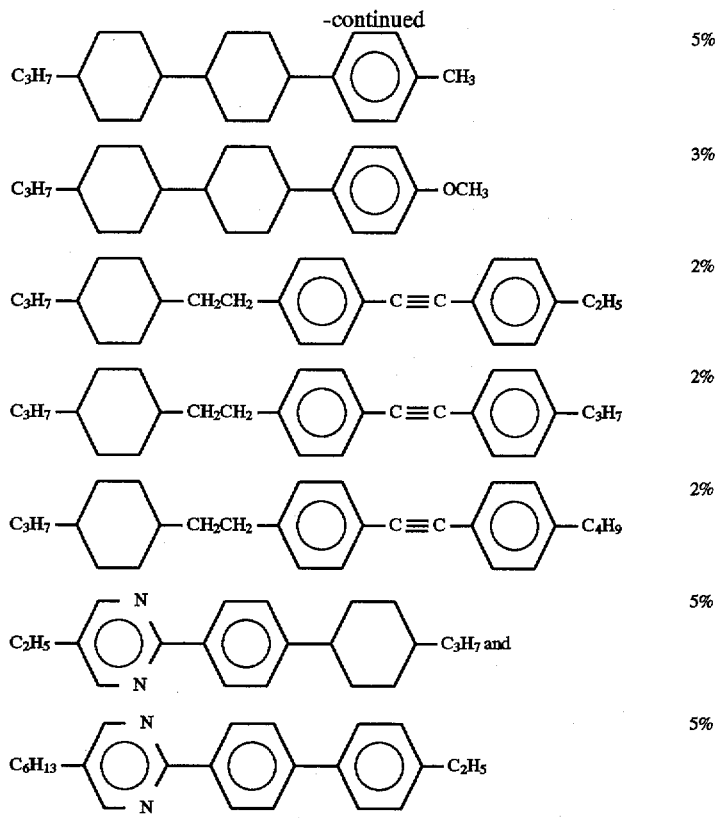
| | |
|---|---|
| | 5% |
| | 3% |
| | 2% |
| | 2% |
| | 2% |
| | 5% |
| | 5% |
was prepared. A clearing point of the composition was 119.5° C. A viscosity, a dielectric anisotropy, and a threshold voltage each at 20° C., of the composition were 22.0 mPa.s, 10.7, and 2.01 V., respectively, and an optical anisotropy at 25° C. of the composition was 0.144.
Example 20
A liquid crystal composition consisting of
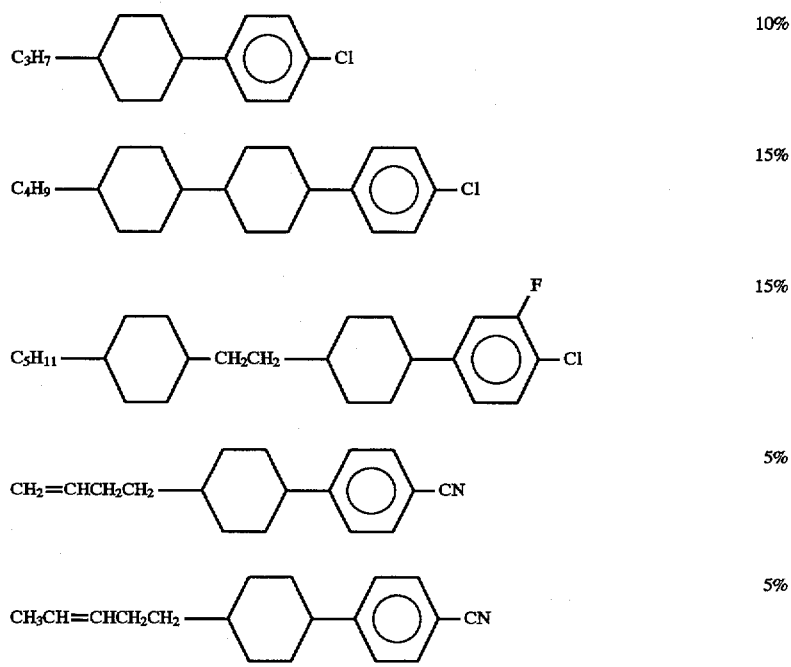
| | |
|---|---|
| | 10% |
| | 15% |
| | 15% |
| | 5% |
| | 5% |

-continued
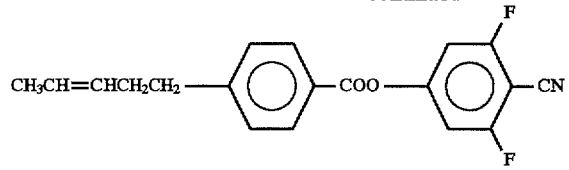 5%
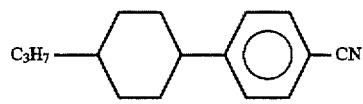 20%
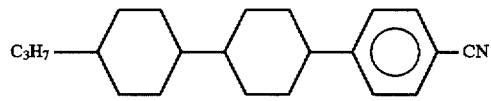 3%
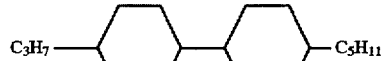 2%
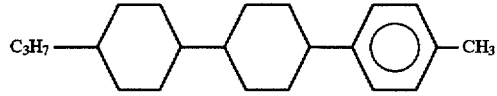 5%
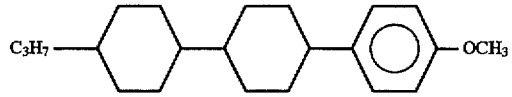 3%
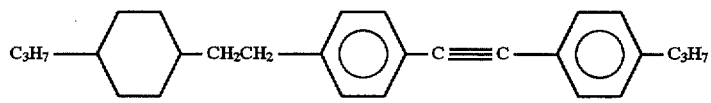 2%
 2%
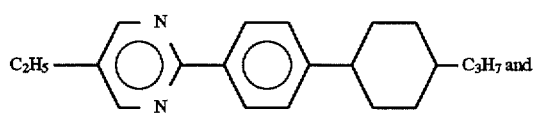 4%
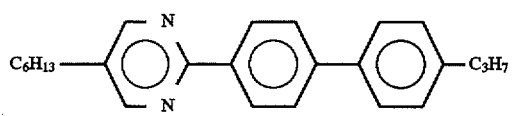 4%
was prepared. A clearing point of the composition was 99.7° C. A viscosity, a dielectric anisotropy, and a threshold voltage each at 20° C., of the composition were 21.1 mPa.s, 9.6, and 2.05 V., respectively, and an optical anisotropy at 25° C. of the composition was 0.133.
Example 21
A liquid crystal composition consisting of
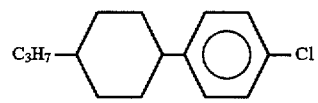 8%
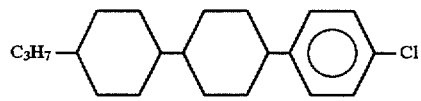 5%
-continued
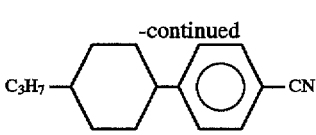 5%
 5%
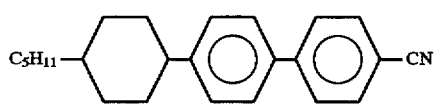 2%
 3%

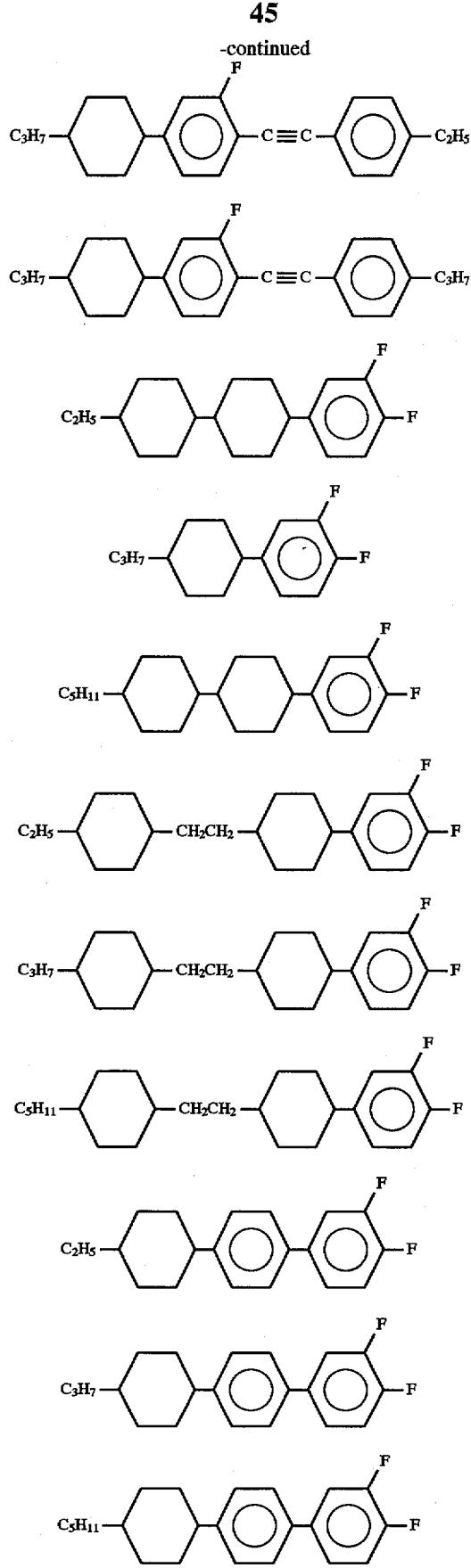
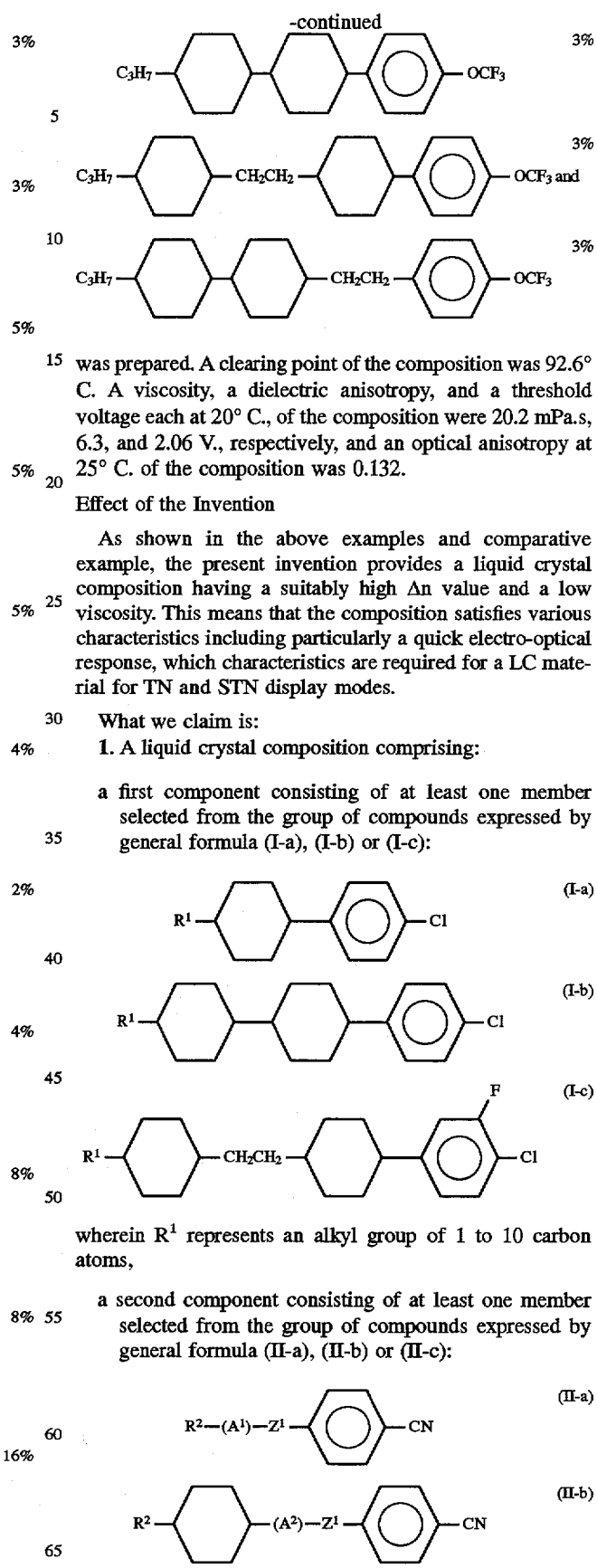

was prepared. A clearing point of the composition was 92.6° C. A viscosity, a dielectric anisotropy, and a threshold voltage each at 20° C., of the composition were 20.2 mPa.s, 6.3, and 2.06 V., respectively, and an optical anisotropy at 25° C. of the composition was 0.132.

Effect of the Invention

As shown in the above examples and comparative example, the present invention provides a liquid crystal composition having a suitably high Δn value and a low viscosity. This means that the composition satisfies various characteristics including particularly a quick electro-optical response, which characteristics are required for a LC material for TN and STN display modes.

What we claim is:

1. A liquid crystal composition comprising:

a first component consisting of at least one member selected from the group of compounds expressed by general formula (I-a), (I-b) or (I-c):

wherein $R^1$ represents an alkyl group of 1 to 10 carbon atoms, a second component consisting of at least one member selected from the group of compounds expressed by general formula (II-a), (II-b) or (II-c):

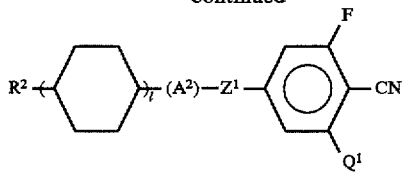

wherein R² represents an alkyl group of 1 to 10 carbon atoms or an alkenyl group of 2 to 10 carbon atoms in each of which groups one or two non-adjacent methylene groups may be replaced by an oxygen atom; $Z^1$ represents —CH₂CH₂—, —COO— or a single bond; $Q^1$ represents H or F; $A^1$ represents trans-1,4-cyclohexylene, 1,4-phenylene or trans-1,3-dioxan-2,5-diyl; $A^2$ represents trans-1,4-cyclohexylene or 1,4-phenylene; and l represents 0 or 1, and a third component consisting of at least one member selected from the group of compounds expressed by general formula (III) or (IV):

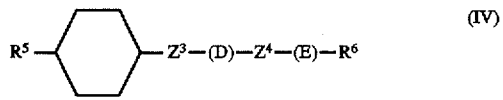

wherein, in formula (III), $R^3$ and $R^4$ each independently represent an alkyl group of 1 to 10 carbon atoms or an alkenyl group of 2 to 8 carbon atoms in each of which groups one or two non-adjacent methylene groups may be replaced by an oxygen atom; B and C each independently represent trans-1,4-cyclohexylene or 1,4-phenylene; $Z^2$ represents —C≡C—, —COO—, —CH₂CH₂— or a single bond; and in formula (IV), $R^5$ represents an alkyl group of 1 to 10 carbon atoms or an alkenyl group of 2 to 10 carbon atoms in each of which groups one or two non-adjacent methylene groups may be replaced by an oxygen atom; $R^6$ represents an alkyl group, an alkoxy group or an alkoxymethyl group each of 1 to 10 carbon atoms; D represents trans-1,4-cyclohexylene or 1,4-phenylene in which a hydrogen atom on either 2- or 3-position may be replaced by F; E represents trans-1,4-cyclohexylene or 1,4-phenylene; $Z^3$ represents —CH₂CH₂—, —COO— or a single bond; and $Z^4$ represents —C≡C—, —COO— or a single bond.

2. A liquid crystal composition according to claim 1, wherein mixing proportions of said first, second and third components are 3–40%, 10–70% and 5–60%, respectively, based upon the total weight of said composition.

3. A liquid crystal composition according to claim 1, further comprising a fourth component consisting of at least one member selected from the group of compounds expressed by general formula (V) or (VI):

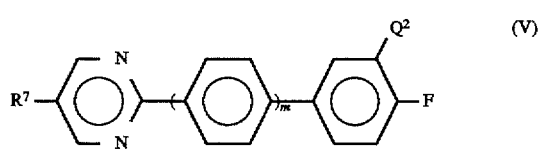

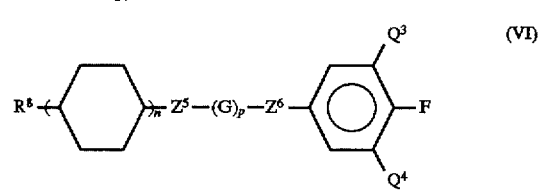

wherein, in formula (V), $R^7$ represents an alkyl group of 1 to 10 carbon atoms; $Q^2$ represents H or F; and m represents 0 or 1; and in formula (VI), $R^8$ represents an alkyl group of 1 to 10 carbon atoms; G represents trans-1,4-cyclohexylene or 1,4-phenylene; $Q^3$ and $Q^4$ each independently represent H or F; n represents 1 or 2; p represents 0 or 1; and $Z^5$ and $Z^6$ each independently represent —COO— or a single bond, with a proviso that when p is 0 then $Z^6$ represents a single bond.

4. A liquid crystal composition according to claim 3, wherein mixing proportions of said first, second, third and fourth components are 3–40%, 10–70%, 5–60% and up to 50%, respectively, based upon the total weight of said composition.

5. A liquid crystal composition according to claim 1, further comprising a fourth component consisting of at least one member selected from the group of compounds expressed by general formula (VII) or (VIII):

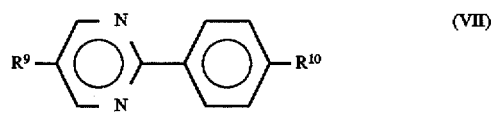

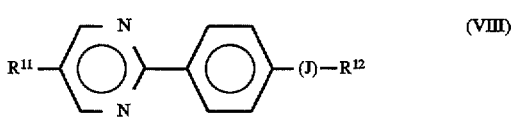

wherein $R^9$, $R^{10}$, $R^{11}$ and $R^{12}$ each independently represent an alkyl group of 1 to 10 carbon atoms or an alkenyl group of 2 to 8 carbon atoms in each of which groups one or two non-adjacent methylene groups may be replaced by an oxygen atom; and J represents trans-1,4-cyclohexylene or 1,4-phenylene.

6. A liquid crystal composition according to claim 5, wherein mixing proportions of said first, second, third and fourth components are 3–40%, 10–70%, 5–60% and up to 50%, respectively, based upon the total weight of said composition.

7. A liquid crystal composition according to claim 3, further comprising a fifth component consisting of at least one member selected from the group of compounds expressed by general formula (VII) or (VIII):

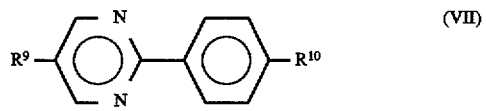

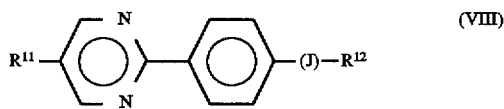

wherein $R^9$, $R^{10}$, $R^{11}$ and $R^{12}$ each independently represent an alkyl group of 1 to 10 carbon atoms or an alkenyl group of 2 to 8 carbon atoms in each of which groups one or two non-adjacent methylene groups may be replaced by an oxygen atom; and J represents trans-1,4-cyclohexylene or 1,4-phenylene.

8. A liquid crystal composition according to claim 7, wherein mixing proportions of said first, second, third, fourth and fifth components are 3–40%, 10–70%, 5–60%, up to 40% and up to 40%, respectively, based upon the total weight of said composition, with a proviso that a subtotal mixing proportion of said fourth and fifth components is 50% or less based upon the total weight of said composition.

9. A liquid crystal composition according any one of claims 1 to 8, wherein, in said formula (III), $R^3$ and $R^4$ each independently represent an alkyl group or an alkoxy group each of 1 to 10 carbon atoms or an alkoxymethyl group of 2–10 carbon atoms; and $Z^2$ represents —C≡C—, —COO— or a single bond.

10. A liquid crystal composition according to any one of claims 1 to 8, wherein, in said formula (IV), $R^5$ represents an alkyl group of 1 to 10 carbon atoms; and $R^6$ represents an alkyl group or an alkoxy group each of 1 to 10 carbon atoms.

11. A liquid crystal composition according to claim 3, wherein, in said formula (III), $R^3$ and $R^4$ each independently represent an alkyl group or an alkoxy group each of 1 to 10 carbon atoms or an alkoxymethyl group of 2 to 10 carbon atoms; and $Z^2$ represents —C≡C—, —COO— or a single bond, and in said formula (IV), $R^5$ represents an alkyl group of 1 to 10 carbon atoms; and $R^6$ represents an alkyl group or an alkoxy group each of 1 to 10 carbon atoms.

12. A liquid crystal composition according to claim 4, wherein, in said formula (III), $R^3$ and $R^4$ each independently represent an alkyl group or an alkoxy group each of 1 to 10 carbon atoms or an alkoxymethyl group of 2 to 10 carbon atoms; and $Z^2$ represents —C≡C—, —COO— or a single bond, and in said formula (IV), $R^5$ represents an alkyl group of 1 to 10 carbon atoms; and $R^6$ represents an alkyl group or an alkoxy group each of 1 to 10 carbon atoms.

13. A liquid crystal composition according to claim 5, wherein, in said formula (III), $R^3$ and $R^4$ each independently represent an alkyl group or an alkoxy group each of 1 to 10 carbon atoms or an alkoxymethyl group of 2 to 10 carbon atoms; and $Z^2$ represents —C≡C—, —COO— or a single bond, and in said formula (IV), $R^5$ represents an alkyl group of 1 to 10 carbon atoms; and $R^6$ represents an alkyl group or an alkoxy group each of 1 to 10 carbon atoms.

14. A liquid crystal composition according to claim 6, wherein, in said formula (III), $R^3$ and $R^4$ each independently represent an alkyl group or an alkoxy group each of 1 to 10 carbon atoms or an alkoxymethyl group of 2 to 10 carbon atoms; and $Z^2$ represents —C≡C—, —COO— or a single bond, and in said formula (IV), $R^5$ represents an alkyl group of 1 to 10 carbon atoms; and $R^6$ represents an alkyl group or an alkoxy group each of 1 to 10 carbon atoms.

15. A liquid crystal composition according to claim 7, wherein, in said formula (III), $R^3$ and $R^4$ each independently represent an alkyl group or an alkoxy group each of 1 to 10 carbon atoms or an alkoxymethyl group of 2 to 10 carbon atoms; and $Z^2$ represents —C≡C—, —COO— or a single bond, and in said formula (IV), $R^5$ represents an alkyl group of 1 to 10 carbon atoms; and $R^6$ represents an alkyl group or an alkoxy group each of 1 to 10 carbon atoms.

16. A liquid crystal composition according to claim 8, wherein, in said formula (III), $R^3$ and $R^4$ each independently represent an alkyl group or an alkoxy group each of 1 to 10 carbon atoms or an alkoxymethyl group of 2 to 10 carbon atoms; and $Z^2$ represents —C≡C—, —COO— or a single bond, and in said formula (IV), $R^5$ represents an alkyl group of 1 to 10 carbon atoms; and $R^6$ represents an alkyl group or an alkoxy group each of 1 to 10 carbon atoms.

17. A liquid crystal display device comprising a liquid crystal composition as defined in claim 2.

18. A liquid crystal display device comprising a liquid crystal composition as defined in claim 4.

19. A liquid crystal display device comprising a liquid crystal composition as defined in claim 6.

20. A liquid crystal display device comprising a liquid crystal composition as defined in claim 8.

21. A liquid crystal display device comprising a liquid crystal composition as defined in claim 12.

22. A liquid crystal display device comprising a liquid crystal composition as defined in claim 14.

23. A liquid crystal display device comprising a liquid crystal composition as defined in claim 16.

* * * * *